(12) United States Patent
Ohya et al.

(10) Patent No.: US 8,980,421 B2
(45) Date of Patent: Mar. 17, 2015

(54) POROUS POLYIMIDE MEMBRANE AND PROCESS FOR PRODUCTION THEREOF

(75) Inventors: Shyusei Ohya, Chiba (JP); Hiroshi Shimazaki, Chiba (JP); Makoto Babazono, Chiba (JP); Yoshiaki Watanabe, Chiba (JP); Dai Yokoyama, Chiba (JP); Yuuichi Fujii, Chiba (JP); Makoto Matsuo, Chiba (JP)

(73) Assignee: Ube Industries, Ltd., Ube-shi (JP)

( * ) Notice: Subject to any disclaimer, the term of this patent is extended or adjusted under 35 U.S.C. 154(b) by 150 days.

(21) Appl. No.: 13/639,663

(22) PCT Filed: Apr. 4, 2011

(86) PCT No.: PCT/JP2011/058559
§ 371 (c)(1),
(2), (4) Date: Oct. 8, 2012

(87) PCT Pub. No.: WO2011/125988
PCT Pub. Date: Oct. 13, 2011

(65) Prior Publication Data
US 2013/0045355 A1  Feb. 21, 2013

(30) Foreign Application Priority Data
Apr. 7, 2010  (JP) .................. 2010-089056

(51) Int. Cl.
*B32B 3/26* (2006.01)
*B29C 71/02* (2006.01)
(Continued)

(52) U.S. Cl.
CPC ............ *B29C 41/24* (2013.01); *B01D 67/0006* (2013.01); *B01D 67/0093* (2013.01);
(Continued)

(58) Field of Classification Search
CPC ............... B01D 71/64; B01D 2325/02; B01D 2325/025; H01M 2/1653; H01M 2/1686
USPC .......................... 428/116, 316.6, 315.5, 315.7
See application file for complete search history.

(56) References Cited

U.S. PATENT DOCUMENTS

| 5,972,080 A | 10/1999 | Nagata |
| 2003/0018094 A1 | 1/2003 | Ohya et al. |
| 2011/0318556 A1 | 12/2011 | Ohya et al. |

FOREIGN PATENT DOCUMENTS

| EP | 2 354 180 A1 | 8/2011 |
| JP | 10 85571 | 4/1998 |

(Continued)

OTHER PUBLICATIONS

Extended European Search Report issued Jun. 10, 2014 in Patent Application No. 11765888.0.

(Continued)

*Primary Examiner* — Hai Vo
(74) *Attorney, Agent, or Firm* — Oblon, McClelland, Maier & Neustadt, L.L.P.

(57) ABSTRACT

A porous polyimide film having a three-layer structure that comprises two surface layers (a) and (b) and a macrovoid layer sandwiched between the surfaces layers (a) and (b). The macrovoid layer has a partition wall bonding to the surface layers (a) and (b), and multiple macrovoids each surrounded by the partition wall and the surface layers (a) and (b) and having a mean pore size in the film plane direction of from 10 to 500 μm. The partition wall of the macrovoid layer has a thickness of from 0.1 to 50 μm and has multiple pores having a mean pore size of from 0.01 to 50 μm. The surface layers (a) and (b) each have a thickness of from 0.1 to 50 μm, at least one of the surface layers has multiple pores having a mean pore size of from more than 5 μm to 200 μm, and the other surface layer has multiple pores having a mean pore size of from 0.01 to 200 μm. The pores in the partition wall of the macrovoid layer as well as in the surface layers (a) and (b) communicate with each other and further communicate with the macrovoids. The film has a total thickness of from 5 to 500 μm and a porosity of from 60 to 95%.

13 Claims, 12 Drawing Sheets

(51) Int. Cl.
  *C08G 69/26* (2006.01)
  *B29C 41/24* (2006.01)
  *B01D 67/00* (2006.01)
  *B01D 71/64* (2006.01)
  *B29K 79/00* (2006.01)
  *B29K 105/04* (2006.01)
  *H01M 2/16* (2006.01)

(52) U.S. Cl.
  CPC ............ *B01D71/64* (2013.01); *B01D 2325/02* (2013.01); *B01D 2325/025* (2013.01); *B29K 2079/08* (2013.01); *B29K 2105/04* (2013.01); *H01M 2/1653* (2013.01); *H01M 2/1686* (2013.01)
  USPC .................. 428/316.6; 428/315.5; 428/315.7; 428/315.9; 428/310.5; 428/116; 264/46.6; 524/538

(56) References Cited

FOREIGN PATENT DOCUMENTS

| | | |
|---|---|---|
| JP | 11 310658 | 11/1999 |
| JP | 2003 38942 | 2/2003 |
| JP | 2003 138057 | 5/2003 |
| JP | 2005 60606 | 3/2005 |
| JP | 2007 211136 | 8/2007 |
| WO | 2010 038873 | 4/2010 |

OTHER PUBLICATIONS

Hiroshi Yabu, et al., "Preparation of honeycomb-patterned polyimide films by self-organization", Langmuir, vol. 19, No. 15, XP-002724801, 2003, pp. 6297-6300.

Mohammad N. Sarbolouki, "Properties of asymmetric polyimide ultrafiltration membranes. I. Pore size and morphology characterization", Journal of Applied Polymer Science, vol. 29, XP-002724802, 1984, pp. 743-753.

International Search Report Issued Apr. 26, 2011 in PCT/JP11/58559 Filed Apr. 4, 2011.

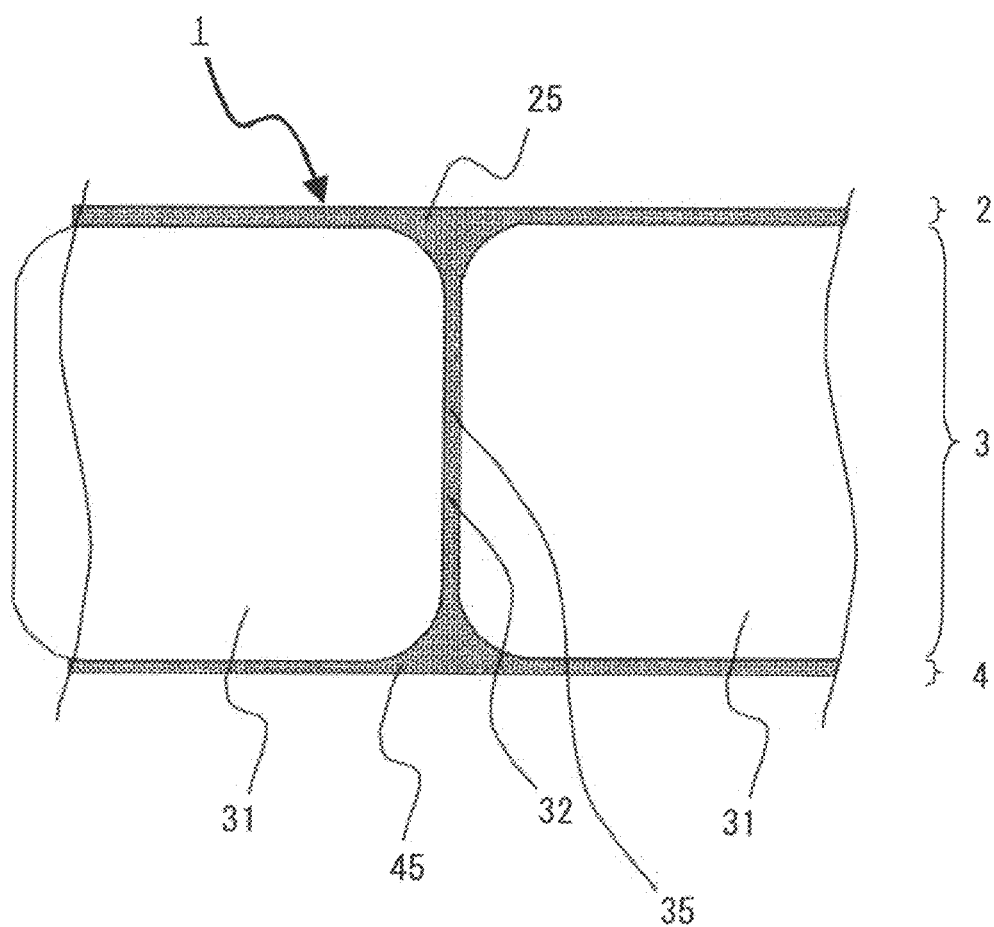

POROUS POLYIMIDE MEMBRANE AND PROCESS FOR PRODUCTION THEREOF

TECHNICAL FIELD

The present invention relates to a porous polyimide film and a process for producing the film.

BACKGROUND ART

A porous polyimide film is used for separators for cells and diaphragms for electrolytic capacitors, and also for duct collection, precision filtration, separation, etc. For example, Patent Document 1 discloses a porous film polyimide that has a large number of through-pores communicating with each other and each having a diameter of from about 0.1 to 5 μm.

CITATION LIST

Patent Literature

[Patent Document 1]: JP-A 11-310658

SUMMARY OF INVENTION

Technical Problem

The problem to be solved by the present invention is to provide a porous polyimide film having a large number of macrovoids, which is more excellent in substance permeability for vapor or the like than conventional porous polyimide films, has a high porosity, is excellent in smoothness of both surfaces thereof, has a relatively high strength and is excellent in resistance to compression stress in the thickness direction thereof though having a high porosity, and to provide a process for producing the film.

Solution to Problem

The present invention provides a porous polyimide film and a process for producing the film mentioned below.

[1] A porous polyimide film having a three-layer structure that comprises two surface layers (a) and (b) and a macrovoid layer sandwiched between the surfaces layers (a) and (b), wherein:
  the macrovoid layer has a partition wall bonding to the surface layers (a) and (b), and multiple macrovoids each surrounded by the partition wall and the surface layers (a) and (b) and having a mean pore size in the film plane direction of from 10 to 500 μm, and
  the partition wall of the macrovoid layer has a thickness of from 0.1 to 50 μm and has multiple pores having a mean pore size of from 0.01 to 50 μm, the surface layers (a) and (b) each have a thickness of from 0.1 to 50 μm, at least one of the surface layers has multiple pores having a mean pore size of from more than 5 μm to 200 μm, and the other surface layer has multiple pores having a mean pore size of from 0.01 to 200 μm, and the pores in the partition wall of the macrovoid layer as well as in the surface layers (a) and (b) communicate with each other and further communicate with the macrovoids;
  the porous polyimide film having a total thickness of from 5 to 500 μm and a porosity of from 60 to 95%.
[2] The porous polyimide film of [1], wherein the surface layers (a) and (b) both have multiple pores having a mean pore size of from more than 5 μm to 200 μm.
[3] The porous polyimide film of [1] or [2], wherein the macrovoid layer has multiple macrovoids having a mean pore size in the film plane direction of from 10 to 500 μm, when seen from the side of the surface layer (a) and/or the side of the surface layer (b).
[4] The porous polyimide film of any of [1] to [3], wherein the thickness of the macrovoid layer and that of the surface layers (a) and (b) are nearly the same.
[5] The porous polyimide film of any of [1] to [4], wherein the Gurley value is at most 10 seconds.
[6] The porous polyimide film of any of [1] to [5], wherein the film thickness change after given a compression stress load of 0.5 MPa at 250° C. for 15 minutes is at most 5%.
[7] The porous polyimide film of any of [1] to [6], in the cross section of which as cut vertically to the film plane direction, the cross section of the macrovoids having a mean pore size in the film plane direction of from 10 to 500 μm accounts for at least 50% of the film cross section.
[8] The porous polyimide film of any of [1] to [7], in the cross section of which as cut vertically to the film plane direction, at least 60% of the macrovoids are such that the ratio of the length thereof in the film plane direction (L) to the length thereof in the film thickness direction (d), L/d falls within a range of from 0.5 to 3.
[9] The porous polyimide film of any of [1] to [8], which has a glass transition temperature of 240° C. or higher, or which does not have a definite transition point at 300° C. or higher.
[10] A process for producing a porous polyimide film of any of [1] to [9], which comprises:
  a step of filmwise casting a polyamic acid solution composition containing a polyamic acid solution (A) that comprises from 0.3 to 60% by mass of a polyamic acid comprising a tetracarboxylic acid unit and a diamine unit and from 40 to 99.7% by mass of an organic polar solvent, and an organic compound (B) having a polar group or a polymer compound (C) having a polar group in the side chain thereof, in an amount of from 0.1 to 200 parts by mass relative to 100 parts by mass of the polyamic acid, and then immersing the resulting film in a solidifying solvent that comprises water as the indispensable ingredient thereof or bringing it into contact with the solvent to thereby form a porous film of the polyamic acid, and
  a step of imidating the porous film of the polyamic acid obtained in the previous step, through heat treatment, wherein:
  the organic compound (B) and the polymer compound (C) each are an organic compound capable of promoting water penetration into the filmwise cast product of the polyamic acid solution composition, and in the heat treatment, the heating rate within a temperature range of 200° C. or higher is at least 25° C./min.
[11] The process for producing a porous polyimide film of [10], wherein the polyamic acid is obtained from at least one tetracarboxylic acid dianhydride selected from a group consisting of biphenyltetracarboxylic acid dianhydride and pyromellitic acid dianhydride, and at least one diamine selected from a group consisting of benzenediamine, diaminodiphenyl ether and bis(aminophenoxy)phenyl.
[12] The process for producing a porous polyimide film of [10] or [11], wherein the organic compound (B) is benzoic acid.
[13] The process for producing a porous polyimide film of [10] or [11], wherein the polymer compound (C) is polyacrylonitrile.

[14] The process for producing a porous polyimide film of any of [10] to [13], wherein the solidification solvent that comprises water as the indispensable ingredient thereof is water or a mixed liquid of from 5% by mass to less than 100% by mass of water and from more than 0% by mass to 95% by mass of an organic polar solvent.

Advantageous Effects of Invention

The porous polyimide film of the present invention has the following excellent advantages:

1) A major part of the cross-sectional structure of the film has a symmetric structure, and the film is extremely easy to use as various flat film materials.

2) The film has a large porosity, and for example, when used as an insulative substrate, the dielectric constant thereof can be lowered.

3) Both surfaces and the support layer thereof have through-pores running from one surface to the other surface, and therefore the film facilitates substance filling or movement therein.

4) The film has macrovoids, and therefore the substance filling amount therein can be large.

5) Both surfaces of the film are excellent in smoothness.

6) A major part of both surface layers and the support has a ladder structure, and therefore, as compared with the bulk density thereof, the strength of the film is relatively high; and though having a high porosity, the resistance to the compression stress to the thickness direction of the film is high and the dimensional stability of the film is also high; and the film thickness change after given a compression stress load of 0.5 MPa at 250° C. for 15 minutes is small.

In addition, the process for producing a porous polyimide film of the present invention produces the porous polyimide film of the present invention efficiently and in a simplified manner.

BRIEF DESCRIPTION OF DRAWINGS

FIG. 1(*b*) is a B-B cross-sectional view of FIG. 1(*a*).

FIG. 2 is an enlarged lateral sectional view of one preferred embodiment of the porous polyimide film of the present invention.

DESCRIPTION OF EMBODIMENTS

Preferred embodiments of the porous polyimide film of the present invention are described with reference to the drawings.

Figure 3:
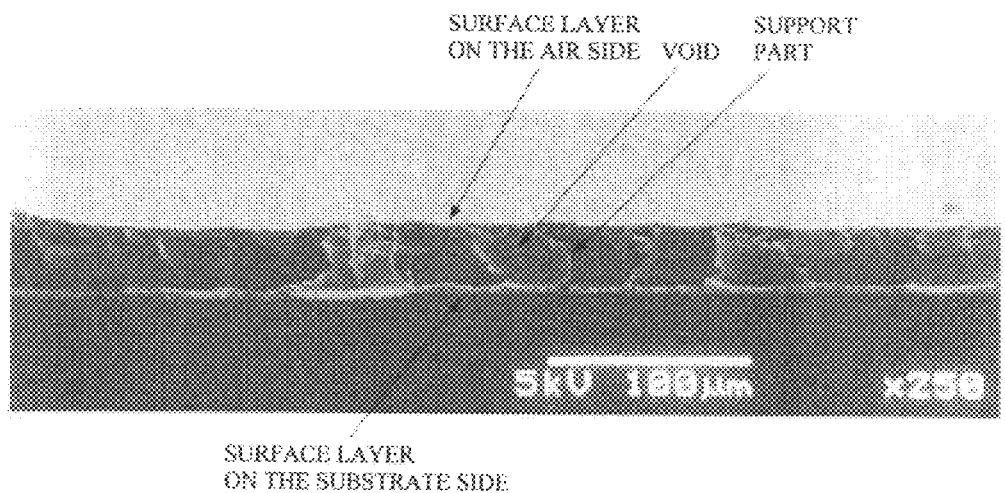
FIG. 3 is a scanning electron micrograph of the lateral section of one preferred embodiment of the porous polyimide film of the present invention.
Figure 4:
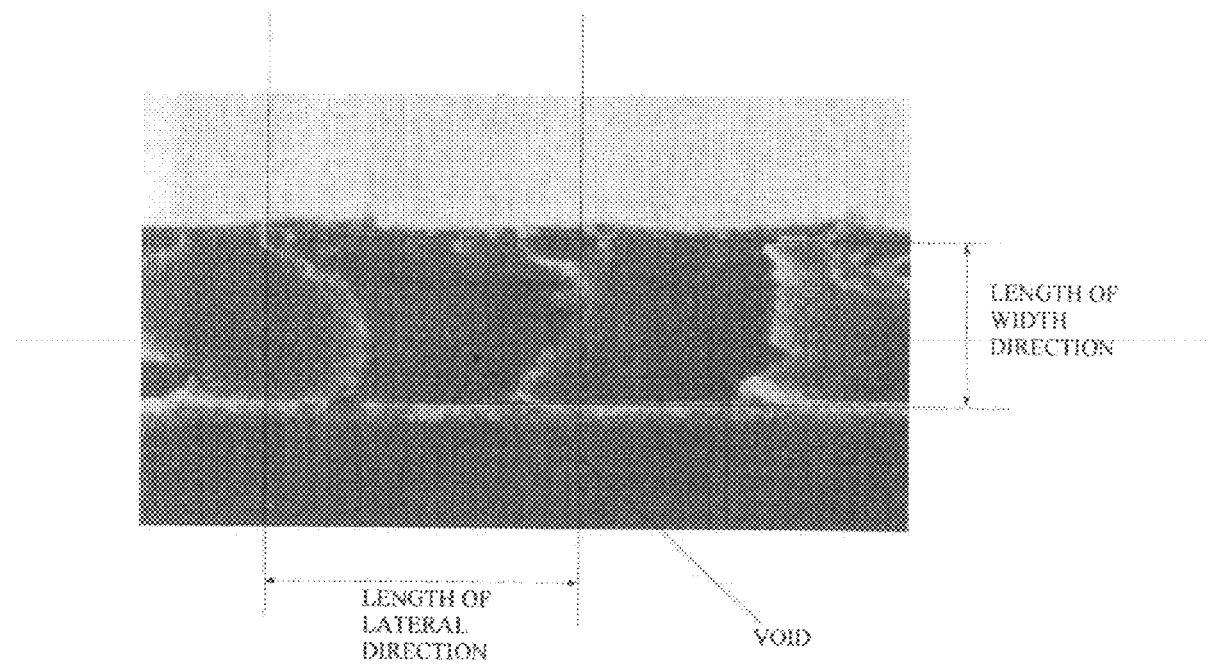
FIG. 4 is an enlarged picture of the honeycomb sandwich structure of FIG. 3.
Figure 5:
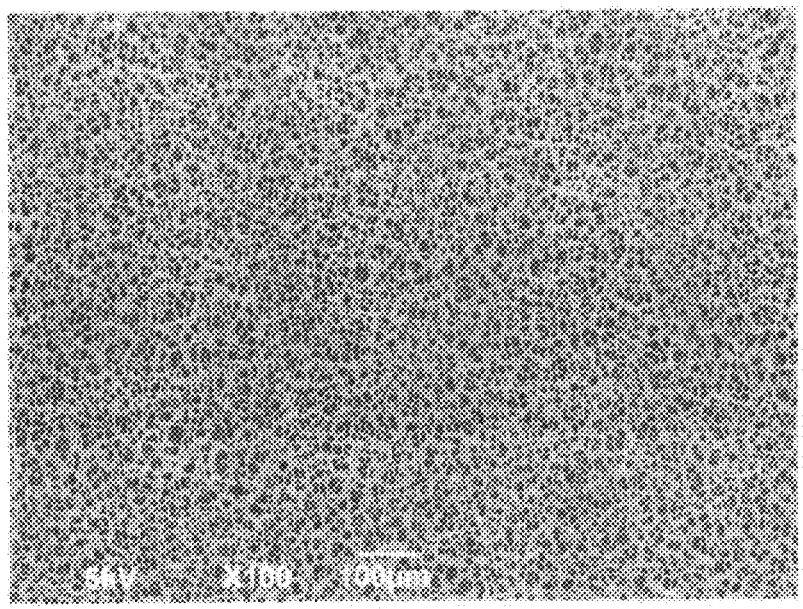
FIG. 5 is a scanning electron micrograph of the air-side surface of the porous polyimide film of Example 1.
Figure 6:
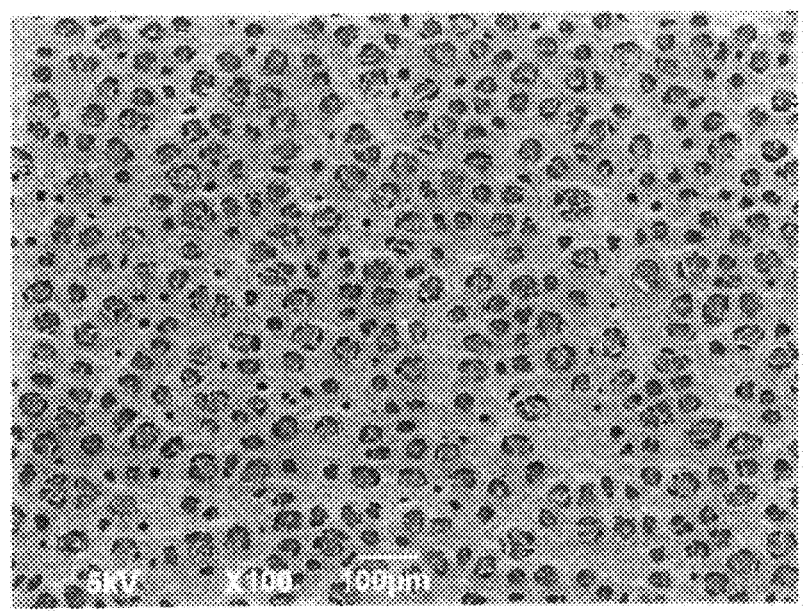
FIG. 6 is a scanning electron micrograph of the substrate-side surface of the porous polyimide film of Example 1.
Figure 7:
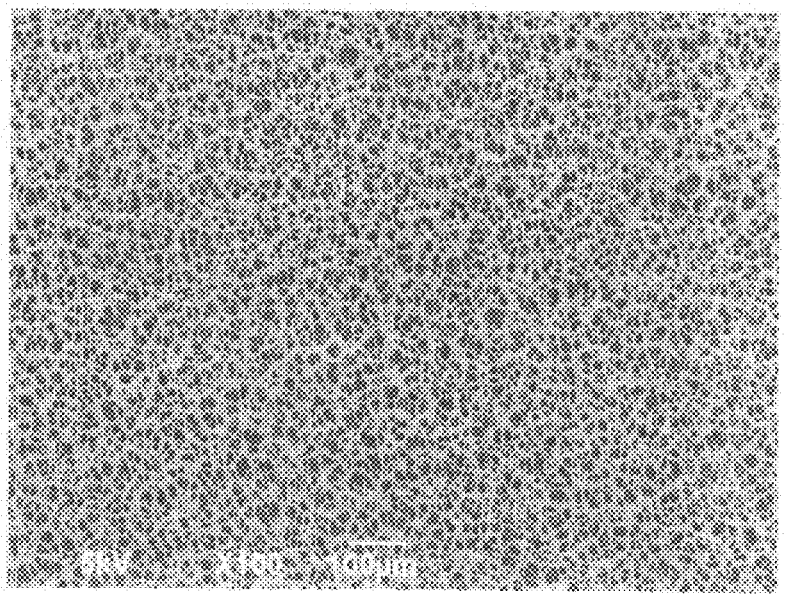
FIG. 7 is a scanning electron micrograph of the air-side surface of the porous polyimide film of Example 2.
Figure 8:
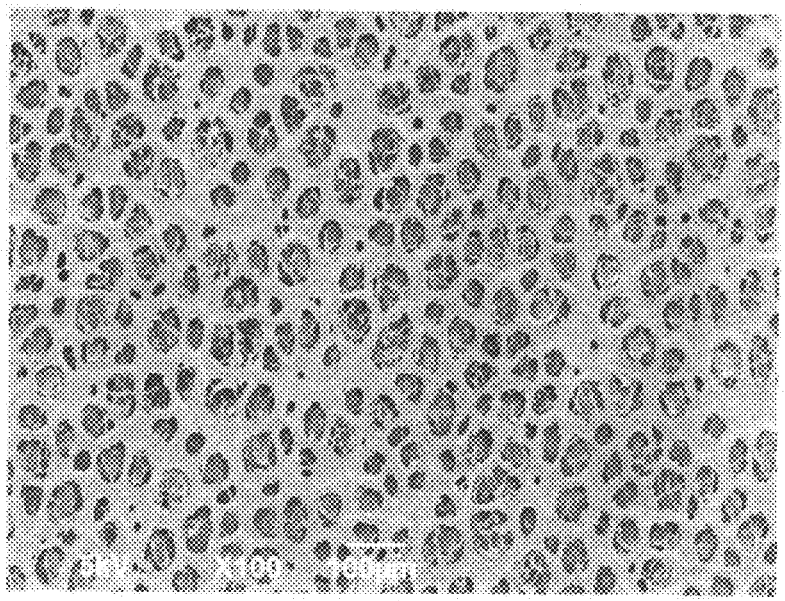
FIG. 8 is a scanning electron micrograph of the substrate-side surface of the porous polyimide film of Example 2.
Figure 9:
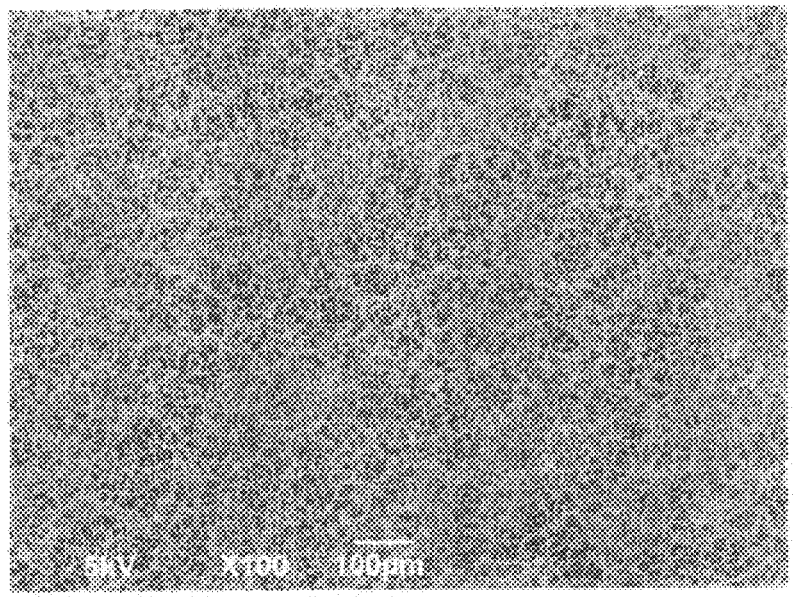
FIG. 9 is a scanning electron micrograph of the air-side surface of the porous polyimide film of Example 3.
Figure 10:
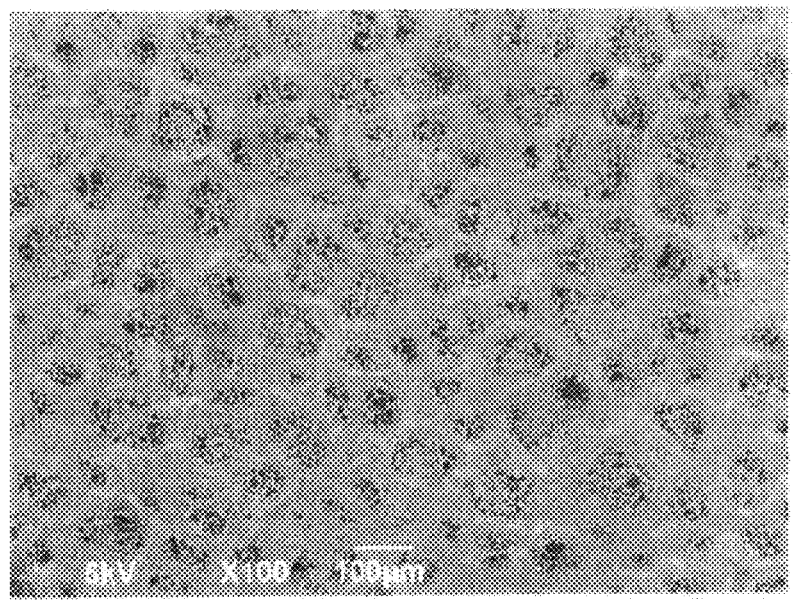
FIG. 10 is a scanning electron micrograph of the substrate-side surface of the porous polyimide film of Example 3.
Figure 11:
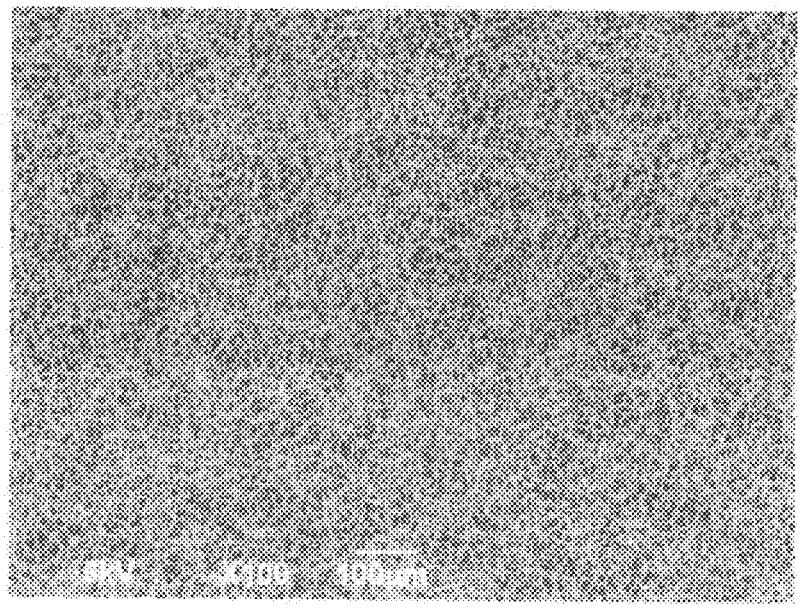
FIG. 11 is a scanning electron micrograph of the air-side surface of the porous polyimide film of Example 4.
Figure 12:
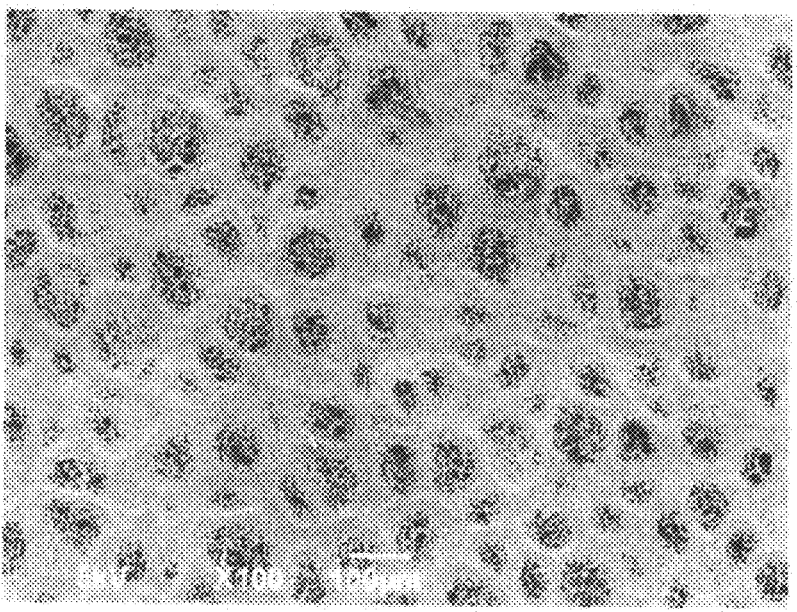
FIG. 12 is a scanning electron micrograph of the substrate-side surface of the porous polyimide film of Example 4.

FIG. 1(*a*) is a plane-sectional view of one preferred embodiment of the porous polyimide film of the present invention; and FIG. 1(*b*) is a B-B cross-sectional view of FIG. 1(*a*). FIG. 2 is an enlarged lateral sectional view of one preferred embodiment of the porous polyimide film of the present invention. FIG. 3 is a scanning electron micrograph of the lateral section of one preferred embodiment of the porous polyimide film of the present invention. FIG. 4 is an enlarged picture of the honeycomb sandwich structure of FIG. 3.

As shown in FIGS. 1 and 2, the porous polyimide film 1 of the present invention is a three-layered porous polyimide film having two surface layers 2 and 4 (surface layers (a) and (b)) and a macrovoid layer 3 sandwiched between the surface layers 2 and 4.

The thickness of the surface layers 2 and 4 is individually from 0.1 to 50 μm, but is preferably from 0.5 to 10 μm from the viewpoint of the strength of the polyimide film, more preferably from 1 to 9 μm, even more preferably from 2 to 8 μm, still more preferably from 2 to 7 μm. From the viewpoint of using the polyimide film for various flat film materials, it is desirable that the thickness of the surface layers 2 and 4 is nearly the same.

The surface layers 2 and 4 each have multiple pores 5 and 45. In the present invention, the mean pore size of the pores in at least one surface layer is from more than 5 μm to 200 μm, preferably from 5.5 to 200 μm, more preferably from 7 to 200 μm, even more preferably from 10 to 200 μm, still more preferably from 10 to 100 μm. In this case, the mean pore size of the pores in the other surface layer is from 0.01 to 200 μm, preferably from 1 to 200 μm, more preferably from 5.5 to 200 μm, even more preferably from 10 to 100 μm, still more preferably from 15 to 70 μm. Preferably, both the surface layers 2 and 4 have multiple pores having a mean pore size of from more than 5 μm to 200 μm.

The maximum pore size of the pores 24 and 45 is preferably at most 500 μm, more preferably from 0.1 to 500 μm, even more preferably from 0.1 to 200 μm. The pores communicate with each other and further communicate with the macrovoids 31.

In that manner, the polyimide film of the present invention have through-pores running from one surface to the other surface thereof, and therefore facilitates substance filling and movement therein and is excellent in substance permeability for vapor, etc. On the other hand, since the mean pore size of the pores formed in the film surface is small and therefore only a substance having a given size can pass through the ores, or that is, the polyimide film of the present invention has a filtering function. In addition, since the mean pore size of the pores formed in the film surface is small, the polyimide film of the present invention is excellent in surface smoothness.

Figure 1A:
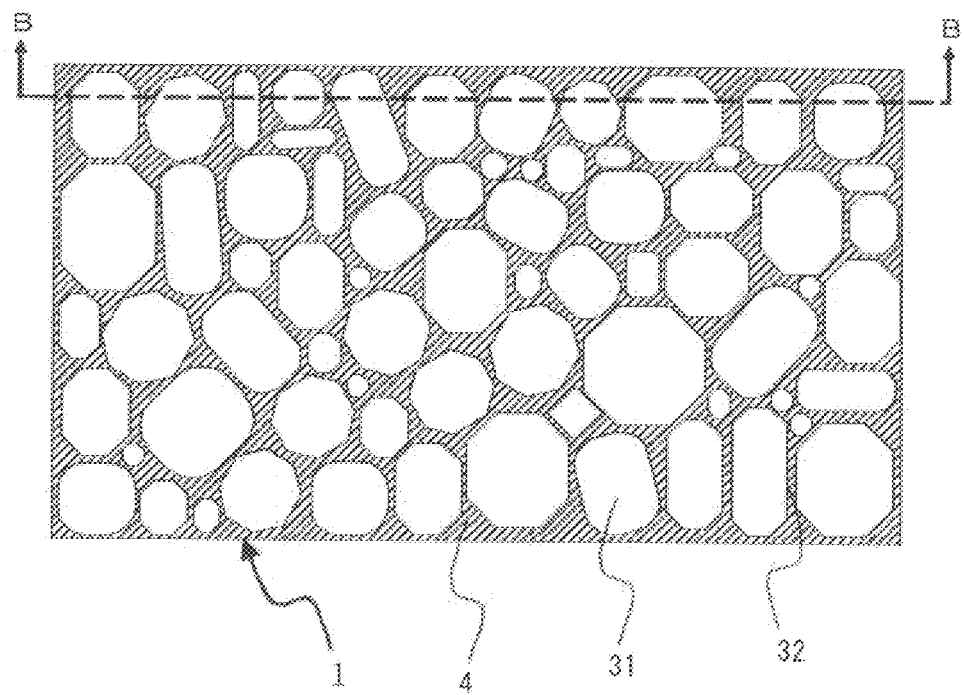
FIG. 1(*a*) is a plane-sectional view of one preferred embodiment of the porous polyimide film of the present invention.
Figure 1B:
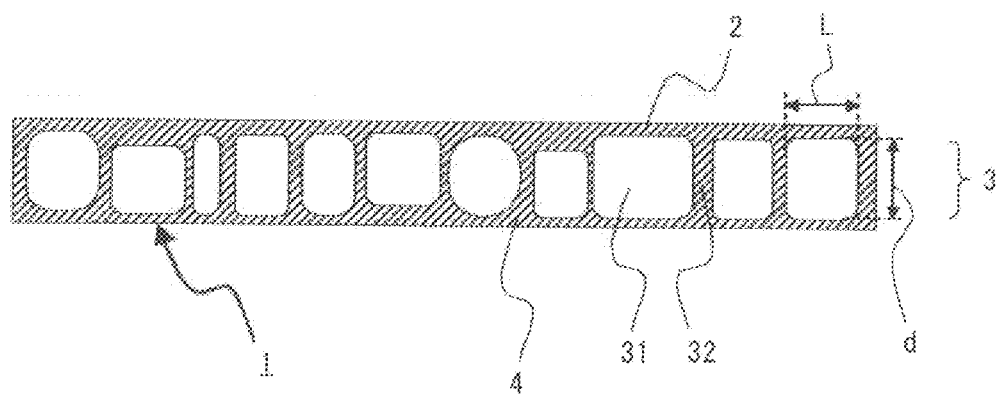

The macrovoid layer 3 has multiple macrovoids 31 and a partition wall 32 that separates the macrovoids 31 from each other. The macrovoid 31 is a space surrounded by the partition wall 32 and the surface layers 2 and 4, and the mean pore size thereof in the film plane direction is from 10 to 500 µm, preferably from 10 to 100 µm, more preferably from 10 to 80 µm. When the macrovoid layer 3 is cut in the direction parallel to the film plane direction, the cross section thereof has, as schematically shown in FIG. 1(a), a honeycomb structure or a structure similar thereto, in which multiple macrovoids each having a predetermined pore size exist as spaced by the partition wall from each other. Specifically, the polyimide film of the present invention has a so-called "honeycomb sandwich structure". In the present specification, the "honeycomb structure" simply means a structure in which multiple spaces individually sectionalized from each other are closely packed, but does not mean only a structure in which the spaces each accurately have a hexagonal cross section.

Having the macrovoids 31, the polyimide film of the present invention has a large empty space region and has a high porosity. Consequently, for example, when the film is used as an insulative substrate, the dielectric constant thereof may be lowered; and when a substance is filled in the voids, the filling amount can be increased.

The thickness of the partition wall 32 that separates the macrovoids 31 from each other is from 0.1 to 50 µm; and from the viewpoint of the strength of the polyimide film 1 and of the communication between the macrovoids 31, the thickness is preferably from 1 to 15 more preferably from 2 to 12 µm, even more preferably from 3 to 10 µm, still more preferably from 4 to 8 µm. Preferably, the thickness of the partition wall 32 and that of the surfaces layers 2 and 4 are nearly the same.

Like the surface layers 2 and 4, the partition wall 32 also has multiple pores 35. The pores 35 have a mean pore size of from 0.01 to 5 µm, preferably from 0.01 to 3 µm, more preferably from 0.02 to 2 µm. The maximum pore size of the pores 35 is preferably at most 10 µm, more preferably from 0.1 to 5 µm, even more preferably from 0.1 to 3 µm. The pores communicate with each other and further communicate with the macrovoids 31.

In that manner, in the polyimide film of the present invention, the macrovoids also communicate with each other therefore facilitating substance filling and movement in the film, and accordingly, the film is excellent in substance permeability for vapor, etc. On the other hand, since the pores formed by the partition wall have a small mean pore size, the film can trap the penetrated substance in the macrovoids therein.

As shown in FIGS. 1(b) and 2 to 4, the partition wall 32 bonds to the surface layers 2 and 4. The partition wall 32 plays a role to separate the macrovoids 31 from each other and also functions as a support to support the surface layers 2 and 4. Accordingly, though having a high porosity, the polyimide film of the present invention is resistant to compression stress in the film thickness direction and has high dimensional stability.

In particular, as shown in FIGS. 3 and 4, in the cross section of the polyimide film of the present invention, as cut vertically to the film plane direction, the partition walls 32 and the surface layers 2 and 4 are constituted to form a ladder configuration. Specifically, the partition walls 32 are formed nearly in the vertical direction to the film plane direction and nearly at regular intervals, and bond to the surface layers 2 and 4.

From the viewpoint of the substance permeability thereof, in the cross section of the polyimide film of the present invention cut vertically to the film plane direction, the cross-sectional area of the macrovoids having a mean pore size in the film plane direction of from 10 to 500 µm is preferably at least 50% of the cross-sectional area of the film, more preferably at least 60%, even more preferably at least 70%, still more preferably at least 75%, and is also preferably at most 98%, more preferably at most 95%, even more preferably at most 90%, still more preferably at most 85%.

From the viewpoint of the substance permeability, the lightweightness and the film structure retentiveness, in the cross section of the polyimide film of the present invention cut vertically to the film plane diction, the ratio of the length in the film plane direction of the macrovoids having a mean pore size of from 10 to 500 µm in the film plane direction (L) to the length thereof in the film thickness direction (d), L/d preferably falls within a range of from 0.5 to 3, more preferably L/d of from 0.8 to 3, even more preferably L/d of from 1 to 3, still more preferably L/d of from 1.2 to 3. Preferably, the number of the macrovoids satisfying the above L/d accounts for at least 60%, more preferably at last 70%, even more preferably from 75 to 100%. As shown in FIG. 4, the length of the macrovoids in the film thickness direction (d) is the maximum length in the film thickness direction of the macrovoids; and the length of the macrovoids in the film plane direction (L) is the maximum length in the film plane direction of the macrovoids.

The total film thickness of the polyimide film of the present invention is from 5 to 500 µm, but from the viewpoint of the mechanical strength of the film, the total thickness is preferably at least 10 µm, more preferably at least 20 µm, even more preferably at least 25 µm, and is preferably at most 300 µm, more preferably at most 100 µm, even more preferably at most 50 µm, still more preferably at most 40 µm.

The porosity of the polyimide film of the present invention is from 60 to 95%, and from the viewpoint of the substance permeability, the mechanical strength and the film structure retentiveness of the film, the porosity thereof is preferably from 70 to 92%, more preferably from 71 to 85%, even more preferably from 71 to 80%.

From the viewpoint of the vapor permeability thereof, the Gurley value (the number of seconds necessary for 100 cc of air to penetrate through the film under a pressure of 0.879 $g/m^2$) of the polyimide film of the present invention is preferably at most 20 seconds, more preferably at most 10 seconds, even more preferably at most 2 seconds, still more preferably at most 0.5 seconds, and the lower limit thereof is, though not specifically defined, preferably a detection limit or more. The Gurley value can be determined according to JIS P8117. The polyimide film of the present invention is extremely excellent in vapor permeability.

Preferably, the film thickness change of the polyimide film of the present invention, after given a compression stress load of 0.5 MPa at 250° C. for 15 minutes, is at most 5%, more preferably at most 3%, even more preferably from 0 to 1%. Also preferably, the dimensional stability of the film in the plane direction at 200° C. for 2 hours, according to ASTM D1204, is preferably within ±1%, more preferably within ±0.8%, even more preferably within ±0.5%.

From the viewpoint of the heat resistance and the dimensional stability at high temperatures thereof, preferably, the polyimide film of the present invention has a glass transition temperature of 240° C. or higher, or does not have a definite transition point at 300° C. or higher.

The porous polyimide film of the present invention is a porous polyimide film comprising, as the main ingredient thereof, a polyimide produced from a tetracarboxylic acid dianhydride and a diamine, and is preferably a porous polyimide film formed of a polyimide produced from a tetracarboxylic acid dianhydride and a diamine.

Any tetracarboxylic acid dianhydride is usable here, and can be suitably selected in accordance with the desired properties of the film. Specific examples of tetracarboxylic acid dianhydrides include pyromellitic acid dianhydride, biphenyltetracarboxylic acid dianhydrides such as 3,3',4,4'-biphenyltetracarboxylic acid dianhydride (s-BPDA) and 2,3,3',4'-biphenyltetracarboxylic acid dianhydride (a-BPDA), as well as oxydiphthalic acid dianhydride, diphenylsulfone-3,4,3',4'-tetracarboxylic acid dianhydride, bis(3,4-dicarboxyphenyl)sulfide dianhydride, 2,2-bis(3,4-dicarboxyphenyl)-1,1,1,3,3,3-hexafluoropropane dianhydride, 2,3,3',4'-benzophenonetetracarboxylic acid dianhydride, 3,3'-4,4'-benzophenonetetracarboxylic acid dianhydride, bis(3,4-dicarboxyphenyl)methane dianhydride, 2,2-bis(3,4-dicarboxyphenyl)propane dianhydride, p-phenylenebis(trimellitic acid monoester dianhydride), p-biphenylenebis(trimellitic acid monoester dianhydride), m-terphenyl-3,4,3',4'-tetracarboxylic acid dianhydride, p-terphenyl-3,4,3',4'-tetracarboxylic acid dianhydride, 1,3-bis(3,4-dicarboxyphenoxy)benzene dianhydride, 1,4-bis(3,4-dicarboxyphenoxy)benzene dianhydride, 1,4-bis(3,4-dicarboxyphenoxy)biphenyl dianhydride, 2,2-bis[(3,4-dicarboxyphenoxy)phenyl]propane dianhydride, 2,3,6,7-naphthalenetetracarboxylic acid dianhydride, 1,4,5,8-naphthalenetetracarboxylic acid dianhydride, 4,4'-(2,2-hexafluoroisopropylidene)diphthalic acid dianhydride, etc. Also preferred is use of aromatic tetracarboxylic acids such as 2,3,3',4'-diphenylsulfone-tetracarboxylic acid, etc. One alone or two or more of these may be used here either singly or as combined.

Of those, more preferred is at least one aromatic tetracarboxylic acid dianhydride selected from a group consisting of biphenyltetracarboxylic acid dianhydride and pyromellitic acid dianhydride. As the biphenyltetracarboxylic acid dianhydride, preferred is use of 3,3',4,4'-biphenyltetracarboxylic acid dianhydride.

Any diamine is usable here. Specific examples of the diamine are mentioned below.

1) Benzenediamines having one benzene nucleus, such as 1,4-diaminobenzene (paraphenylenediamine), 1,3-diaminobenzene, 2,4-diaminotoluene, 2,6-diaminotoluene, etc.;

2) Diamines having two benzene nuclei, for example, diaminodiphenyl ethers such as 4,4'-diaminodiphenyl ether and 3,4'-diaminodiphenyl ether, as well as 4,4'-diaminodiphenylmethane, 3,3'-dimethyl-4,4'-diaminobiphenyl, 2,2'-dimethyl-4,4'-diaminobiphenyl, 2,2'-bis(trifluoromethyl)-4,4'-diaminobiphenyl, 3,3'-dimethyl-4,4'-diaminodiphenylmethane, 3,3'-dicarboxy-4,4'-diaminodiphenylmethane, 3,3',5,5'-tetramethyl-4,4'-diaminodiphenylmethane, bis(4-aminophenyl) sulfide, 4,4'-diaminobenzanilide, 3,3'-dichlorobenzidine, 3,3'-dimethylbenzidine, 2,2'-dimethylbenzidine, 3,3'-dimethoxybenzidine, 2,2'-dimethoxybenzidine, 3,3'-diaminodiphenyl ether, 3,4'-diaminodiphenyl ether, 4,4'-diaminodiphenyl ether, 3,3'-diaminodiphenyl sulfide, 3,4'-diaminodiphenyl sulfide, 4,4'-diaminodiphenyl sulfide, 3,3'-diaminodiphenyl sulfone, 3,4'-diaminodiphenyl sulfone, 4,4'-diaminodiphenyl sulfone, 3,3'-diaminobenzophenone, 3,3'-diamino-4,4'-dichlorobenzophenone, 3,3'-diamino-4,4'-dimethoxybenzophenone, 3,3'-diaminodiphenylmethane, 3,4'-diaminodiphenylmethane, 4,4'-diaminodiphenylmethane, 2,2-bis(3-aminophenyl)propane, 2,2-bis(4-aminophenyl)propane, 2,2-bis(3-aminophenyl)1,1,1,3,3,3-hexafluoropropane, 2,2-bis(4-aminophenyl)-1,1,1,3,3,3-hexafluoropropane, 3,3'-diaminodiphenyl sulfoxide, 3,4'-diaminodiphenyl sulfoxide, 4,4'-diaminodiphenyl sulfoxide, etc.;

3) Diamines having three benzene nuclei, such as 1,3-bis(3-aminophenyl)benzene, 1,3-bis(4-aminophenyl)benzene, 1,4-bis(3-aminophenyl)benzene, 1,4-bis(4-aminophenyl)benzene, 1,3-bis(4-aminophenoxy)benzene, 1,4-bis(3-aminophenoxy)benzene, 1,4-bis(4-aminophenoxy)benzene, 1,3-bis(3-aminophenoxy)-4-trifluoromethylbenzene, 3,3'-diamino-4-(4-phenyl)phenoxybenzophenone, 3,3'-diamino-4,4'-di(4-phenylphenoxy)benzophenone, 1,3-bis(3-aminophenylsulfide)benzene, 1,3-bis(4-aminophenylsulfide)benzene, 1,4-bis(4-aminophenylsulfide)benzene, 1,3-bis(3-aminophenylsulfone)benzene, 1,3-bis(4-aminophenylsulfone)benzene, 1,4-bis(4-aminophenylsulfone)benzene, 1,3-bis[2-(4-aminophenyl)isopropyl]benzene, 1,4-bis[2-[(3-aminophenyl)isopropyl]benzene, 1,4-bis[2-(4-aminophenyl)isopropyl]benzene, etc.;

4) Diamines having four benzene nuclei, such as 3,3'-bis(3-aminophenoxy)biphenyl, 3,3'-bis(4-aminophenoxy)biphenyl, 4,4'-bis(3-aminophenoxy)biphenyl, 4,4'-bis(4-aminophenoxy)biphenyl, bis[3-(3-aminophenoxy)phenyl]ether, bis[3-(4-aminophenoxy)phenyl]ether, bis[4-(3-aminophenoxy)phenyl]ether, bis[4-[(4-aminophenoxy)phenyl]ether, bis[3-(3-aminophenoxy)phenyl]ketone, bis[3-(4-aminophenoxy)phenyl]ketone, bis[4-(3-aminophenoxy)phenyl]ketone, bis[4-[(4-aminophenoxy)phenyl]ketone, bis(3-(3-aminophenoxy)phenyl]sulfide, bis[3-(4-aminophenoxy)phenyl]sulfide, bis[4-(3-aminophenoxy)phenyl]sulfide, bis[4-(4-aminophenoxy)phenyl]sulfide, bis[3-(3-aminophenoxy)phenyl]sulfone, bis[3-(4-aminophenoxy)phenyl]sulfone, bis[4-(3-aminophenoxy)phenyl]sulfone, bis[4-(4-aminophenoxy)phenyl]sulfone, bis[3-(3-aminophenoxy)phenyl]methane, bis[3-(4-aminophenoxy)phenyl]methane, bis[4-(3-aminophenoxy)phenyl]methane, bis[4-(4-aminophenoxy)phenyl]methane, 2,2-bis[3-(3-aminophenoxy)phenyl]propane, 2,2-bis[3-(4-aminophenoxy)phenyl]propane, 2,2-bis[4-(3-aminophenoxy)phenyl]propane, 2,2-bis[4-(4-aminophenoxy)phenyl]propane, 2,2-bis[3-(3-aminophenoxy)phenyl]-1,1,1,3,3,3-hexafluoropropane, 2,2-bis[3-(4-aminophenoxy)phenyl]-1,1,1,3,3,3-hexafluoropropane, 2,2-bis[4-(3-aminophenoxy)phenyl]-1,1,1,3,3,3-hexafluoropropane, 2,2-bis[4-(4-aminophenoxy)phenyl]-1,1,1,3,3,3-hexafluoropropane, etc.

One alone or two or more of these may be used here either singly or as combined. The diamines to be used here may be suitably selected in accordance with the intended properties thereof.

Of those, preferred are aromatic diamine compounds, and preferably used here are 3,3'-diaminodiphenyl ether, 3,4'-diaminodiphenyl ether, 4,4'-diaminodiphenyl ether, paraphenylenediamine, 1,3-bis(3-aminophenyl)benzene, 1,3-bis(4-aminophenyl)benzene, 1,4-bis(3-aminophenyl)benzene, 1,4-bis(4-aminophenyl)benzene, 1,3-bis(4-aminophenoxy)benzene, 1,4-bis(3-aminophenoxy)benzene. Especially preferred is at least one diamine selected from a group consisting of benzenediamine, diaminodiphenyl ether and bis(aminophenoxy)phenyl.

From the viewpoint of the heat resistance and the dimensional stability at high temperatures thereof, preferably, the porous polyimide film is formed of a polyimide produced from a combination of a tetracarboxylic acid dianhydride and a diamine, and has a glass transition temperature of 240° C. or higher, or does not have any definite transition point at 300° C. or higher.

From the viewpoint of the heat resistance and the dimensional stability at high temperatures thereof, preferably, the porous polyimide film of the present invention is a porous polyimide film formed of the aromatic polyimide mentioned below.

(i) An aromatic polyimide comprising at least one tetracarboxylic acid unit selected from a group consisting of a biphenyltetracarboxylic acid unit and a pyromellitic acid unit, and an aromatic diamine unit, (ii) An aromatic polyimide comprising a tetracarboxylic acid unit and at least one aromatic diamine unit selected from a group consisting of a benzenediamine unit, diaminodiphenyl ether unit and a bis(aminophenoxy)phenyl unit, and/or (iii) An aromatic polyimide comprising at least one tetracarboxylic acid unit selected from a group consisting of a biphenyltetracarboxylic acid unit and a pyromellitic acid unit, and at least one aromatic diamine unit selected from a group consisting of a benzenediamine unit, a diaminodiphenyl ether unit and a bis(aminophenoxy)phenyl unit.

Next described is a process for producing the porous polyimide film of the present invention.

The process for producing a porous polyimide film of the present invention comprises a step of filmwise casting a polyamic acid solution composition containing a polyamic acid solution (A) that comprises from 0.3 to 60% by mass of a polyamic acid comprising a tetracarboxylic acid unit and a diamine unit and from 40 to 99.7% by mass of an organic polar solvent, and an organic compound (B) having a polar group or a polymer compound (C) having a polar group in the side chain thereof, in an amount of from 0.1 to 200 parts by mass relative to 100 parts by mass of the polyamic acid, and then immersing the resulting film in a solidifying solvent that comprises water as the indispensable ingredient thereof or bringing it into contact with the solvent to thereby form a porous film of the polyamic acid, and a step of imidating the porous film of the polyamic acid obtained in the previous step, through heat treatment. In this, the organic compound (B) and the polymer compound (C) each are an organic compound capable of promoting water penetration into the filmwise cast product of the polyamic acid solution composition.

The polyamic acid is a polyimide precursor or a partially-imidated polyimide precursor that comprises a tetracarboxylic acid unit and an amine unit. The polyamic acid can be obtained through polymerization of a tetracarboxylic acid dianhydride and a diamine. Thermal imidation or chemical imidation of a polyamic acid brings about ring closure to give a polyimide. The rate of imidation to give the polyimide in the present invention is preferably least about 80%, more preferably at least 85%, even more preferably at least 90%, still more preferably at least 95%.

Any organic polar solvent is usable as the solvent for polymerizing the polyamic acid. For example, herein usable are organic polar solvents such as p-chlorophenol, o-chlorophenol, N-methyl-2-pyrrolidone (NMP), pyridine, N,N-dimethylacetamide (DMAc), N,N-dimethylformamide, dimethylsulfoxide, tetramethylurea, phenol, cresol, etc. Especially preferred for use herein is N-methyl-2-pyrrolidone (NMP) or N,N-dimethylacetamide (DMAc). As the tetracarboxylic acid dianhydride and the diamine, preferred for use herein are those mentioned above.

The polyamic acid can be produced according to any method using a tetracarboxylic acid dianhydride, a diamine and the above-mentioned organic polar solvent. For example, a tetracarboxylic acid and a diamine are reacted nearly in an equivalent molar ratio of the two, preferably at 100° C. or lower, more preferably at 80° C. or lower, even more preferably at from 0 to 60° C., still more preferably at from 20 to 60° C., and preferably for about 0.2 hours or more, more preferably for from 0.3 to 60 hours, thereby giving a polyamic acid solution.

In producing the polyamic acid solution, any molecular weight-controlling agent may be added to the reaction solution for controlling the molecular weight of the polyamic acid to be produced.

The logarithmic viscosity of the polyamic acid (at 30° C., at a concentration of 0.5 g/100 mL, in a solvent of NMP) may be any one capable of producing the porous polyimide film of the present invention. In the process of the present invention, the logarithmic viscosity of the polyamic acid to be used is preferably at least 0.3, more preferably from 0.5 to 7.

The polyamic acid of a type that has been partly imidated may also be used in the present invention so far as the partial imidation could fall within a range not having influence on the present invention.

The polyamic acid solution (A) comprises from 0.3 to 60% by mass of a polyamic acid and from 40 to 99.7% by mass of an organic polar solvent. When the content of the polyamic acid is less than 0.3% by mass, then the film strength of the porous polyimide film produced would lower; but when more than 60% by mass, then the substance permeability of the porous polyimide film would lower. The content of the polyamic acid in the polyamic acid solution (A) is preferably from 1 to 30% by mass, more preferably from 2 to 15% by mass, even more preferably from 5 to 10% by mass; and the content of the organic polar solvent in the polyamic acid solution (A) is preferably from 70 to 99% by mass, more preferably from 85 to 98% by mass, even more preferably from 90 to 95% by mass.

The polyamic acid solution (A) may be a solution obtained through polymerization of a tetracarboxylic acid dianhydride and a diamine in the presence of an organic polar solvent, or a solution obtained by dissolving a polyamic acid in an organic polar solvent.

The polyamic acid solution composition includes a composition containing the polyamic acid solution (A) and an organic compound (B) having a polar group, or a composition containing the polyamic acid solution (A) and a polymer compound (C) having a polar group, or a composition containing the polyamic acid solution (A), an organic compound (B) having a polar group and a polymer compound (C) having a polar group. Preferred is a composition containing the polyamic acid solution (A) and an organic compound (B) having a polar group, or a composition containing the polyamic acid solution (A) and a polymer compound (C) having a polar group.

The organic compound (B) having a polar group, and the polymer compound (C) having a polar group each are an organic compound capable of promoting water penetration into the filmwise cast product of the polyamic acid solution composition. Promoting the water penetration into the filmwise cast product of the polyamic acid solution composition makes it possible to form macrovoids having a mean pore size of from 10 to 500 μm in the polyimide film.

The organic compound (B) having a polar group may be any one capable of realizing the effect of promoting more the solidification of the polyamic acid in the step of immersing the filmwise cast product of the polyamic acid solution composition in a solidification bath, than in the solidification step of the polyamic acid in the polyamic acid solution composition not containing the polar group-having organic compound (B), but is preferably one having the effect of promoting rapid solidification from the surface kept in contact with the solidification bath toward the inside in the film thickness direction. Accordingly, the organic compound (B) having a polar group is preferably a compound not reactive with or hardly reactive with the polyamic acid.

As the organic compound (B) having a polar group, for example, herein usable are organic compounds having a carboxylic acid group such as benzoic acid, phthalic acid, etc., organic compounds having a nitrile group, organic compounds having a hydroxyl group, organic compounds having a sulfonic acid group, etc. One alone or two or more of these may be used here either singly or as combined. In particular, as the organic compound having a polar group, especially preferred is an organic compound having a carboxylic acid group such as benzoic acid, phthalic acid or the like.

The polymer compound (C) having a polar group may be any one capable of realizing the effect of promoting more the solidification of the polyamic acid in the step of immersing the filmwise cast product of the polyamic acid solution composition in a solidification bath, than in the solidification step of the polyamic acid in the polyamic acid solution composition not containing the polymer compound (C), but is preferably one having the effect of promoting rapid solidification from the surface kept in contact with the solidification bath toward the inside in the film thickness direction. Accordingly, the polymer compound (C) is preferably a compound not reactive with or hardly reactive with the polyamic acid.

As the polymer compound (C) having a polar group, there are mentioned a polymer (e.g., vinyl polymer) having a polar group such as a CN group, an OH group, a COOH group, an $SO_3H$ group, an $NH_2$ group or the like in the side chain thereof, etc. One alone or two or more of these may be used here either singly or as combined. In particular, as the polymer compound (C) having a polar group, preferred is a vinyl polymer having a polar group such as a CN group, an OH group, a COOH group, an $SO_3H$ group, an $NH_2$ group or the like in the side chain thereof, for example, polyacrylonitrile, etc.

The content of the polymer compound (C) in the polyamic acid solution composition is preferably from 0.1 to 200 parts by mass relative to 100 parts by mass of the polyamic acid therein, preferably from 1 to 150 parts by mass, more preferably from 10 to 100 parts by mass, even more preferably from 20 to 70 parts by mass, from the viewpoint of formation of macrovoids in the film.

In case where the polyamic acid solution composition contains an organic compound (B) having a polar group and a polymer compound (C) having a polar group, the total content of the organic compound (B) and the polymer compound (C) may be from 0.1 to 200 parts by mass relative to 100 parts by mass of the polyamic acid therein, preferably from 1 to 150 parts by mass, more preferably from 10 to 100 parts by mass, even more preferably from 20 to 70 parts by mass, from the viewpoint of formation of macrovoids in the film.

The polymer compound (C) having a polar group preferably satisfies at least one of the following requirements (C1) to (C4), more preferably the following requirements (C1) to (C3), even more preferably all the following requirements (C1) to (C4):

(C1) The compound is insoluble or hardly soluble in water, the solidification solvent and/or the organic polar solvent.

(C2) The compound can be decomposed in the thermal imidation step.

(C3) The polymer compound (C) having a polar group suspends homogeneously in the polyamic acid solution composition.

(C4) The compound is immiscible with the polyamic acid.

Though not clear, the action mechanism of the polymer compound (C) having a polar group could be considered as follows:

c1) The polymer compound (C) could remain in the polyamic acid as a substance immiscible with the acid. A part or all of the polymer compound (C) dissolves out in the solidification bath while a porous film of the polyamic acid is formed by immersing the polyamic acid solution composition in the solidification solvent or by bringing it into contact with the solvent, and is then decomposed in the subsequent step of thermal imidation. As a result, the part where the removed polymer compound (C) existed in the partition wall of the macrovoid layer and the surface layers (a) and (b) of the polyimide film forms pores, and the substance permeability of the polyimide film is thereby enhanced, and/or c2) The compound could have some influence on the solidification step, for example, by promoting the solidification of the polyamic acid solution composition in the step, and the substance permeability of the polyimide film is thereby enhanced.

In case where a polymer compound (C) having a polar group is added to the polyamic acid solution composition, the polymer compound (C) to be added thereto could be a simple substance of itself, or a solution or suspension of the compound may also be added to the composition.

In producing the polyamic acid solution composition, the solution could be in the form of a suspension. In such a case, the suspension may be stirred for a sufficient period of time to keep a homogeneous state, and the suspension of the type can be used for producing the polyimide in the present invention.

The solution viscosity of the polyamic acid solution composition is preferably from 10 to 10000 poises (1 to 1000 Pa·s), from the viewpoint of easy casting and film strength, more preferably from 100 to 3000 poises (10 to 300 Pa·s), even more preferably from 200 to 2000 poises (20 to 200 Pa·s), still more preferably from 300 to 1000 poises (30 to 100 Pa·s).

(Casting)

In the production process for porous polyimide in the present invention, first a polyamic acid solution composition is filmwise cast. The casting method is not specifically defined. For example, a polyamic acid solution composition is used as a dope liquid, and using a blade, a T-die or the like, the polyamic acid solution composition is filmwise cast on a glass plate, a stainless plate or the like. As the case may be, the polyamic acid solution composition may be intermittently or continuously filmwise cast on an endlessly running belt or drum, thereby continuously producing individually-cut cast pieces or a long cast product. The belt or drum may be any one not influenced by the polyamic acid solution condition and the solidification solution, and stainless or the like metal-made ones or polytetrafluoroethylene or the like resin-made ones can be used here. The polyamic acid solution composition that has been filmwise shaped through the T-die can be put into a solidification bath directly as it is thereinto. If desired, one surface or both surfaces of the cast product may be brought into contact with a vapor (air, inert gas, etc.) containing water vapor or the like.

(Production of Porous Film of Polyamic Acid)

Next, the cast product is immersed in or brought into contact with a solidification solvent that comprises water as the indispensable ingredient thereof, thereby precipitating a polyamic acid and forming pores therein to give a porous film of the polyamic acid. Thus obtained, the porous film of the polyamic acid may be, if desired, washed and/or dried.

As the solidification solvent comprising water as the indispensable ingredient thereof, herein usable is water, or a mixture solution of from 5% by mass to less than 100% by mass of water and from more than 0% by mass to 95% by mass of an organic polar solvent. From the viewpoint of the safety aspect against fire and the production cost and from the viewpoint of securing the homogeneousness of the film to be obtained, preferred is use of a solidification solvent that contains water and an organic polar solvent. The organic polar solvent usable for the solidification solvent includes alcohols such as ethanol, methanol and others, and acetone and the like that are poor solvents for polyamic acid.

In case where the solidification solvent is a mixture solution of water and an organic polar solvent, the water content in 100% by mass of the solidification solvent is preferably from 5% by mass to less than 100% by mass, more preferably from 20% by mass to less than 100% by mass, even more preferably from 30 to 95% by mass, still more preferably from 45 to 90% by mass. The content of the organic polar solvent in 100% by mass of the solidification solvent is preferably from more than 0% by mass to 95% by mass, more preferably from more than 0% by mass to 80% by mass, even more preferably from 5 to 70% by mass, still more preferably from 10 to 55% by mass.

The temperature of the solidification solvent may be suitably determined according to the object thereof and for example, the temperature may fall within a range of from −30 to 70° C., preferably from 0 to 60° C., more preferably from 10 to 50° C.

(Imidation Treatment)

Next, the obtained polyamic acid porous film is imidated to give a porous polyimide film. The imidation includes thermal imidation treatment, chemical imidation treatment, etc. In the present invention, preferred is thermal imidation treatment.

(Thermal Imidation Treatment)

For thermal imidation treatment, for example, the polyamic acid porous film may be fixed onto a support by the use of pins, chucks, pinch rolls or the like so that the film could not lose the flatness through thermal shrinkage, and heated in air. Regarding the reaction condition, for example, the heating temperature may be from 280 to 600° C., preferably from 350 to 550° C. and the heating time may be from 1 to 120 minutes, preferably from 2 to 120 minutes, more preferably from 3 to 90 minutes, even more preferably from 5 to 60 minutes.

In the process of the present invention, the heating rate in a temperature range of 200° C. or higher for the thermal imidation treatment may be at least 25° C./min but is preferably at least 50° C./min; and the upper limit of the heating rate is not specifically defined. In case where the upper limit of the heating rate is settled, the heating rate may be from 50 to 500° C./min, but is preferably from 50 to 400° C./min, more preferably from 70 to 300° C./min, even more preferably from 120 to 200° C./min. Heating at the above-mentioned heating rate in the temperature range of 200° C. or higher in which the imidation reaction occurs remarkably greatly enhances the surface opening rate and the pore size, thereby giving the porous polyimide film of the present invention having a greatly enhanced substance permeability for vapor, etc.

In case where the polyamic acid solution composition that contains a polymer compound (C) having a polar group is used, preferably, the porous film of the polyamic acid is heated for thermal imidation at a temperature not lower than the thermal decomposition starting temperature of the polymer compound (C). The thermal decomposition starting temperature of the polymer compound (C) may be measured in air and under the condition of 10° C./min, for example, using a thermogravimetric analyzer (TGA).

In general, in case where a polyimide film is formed of a cast product of a polyamic acid solution, rapid heating for temperature elevation results in solvent vaporization to induce a foaming phenomenon, and therefore a good film could not be obtained. Therefore, the system is heated at a gentle heating rate until a predetermined amount of solvent is evaporated away and the solution is gelled. On the other hand, in a case of a porous polyimide film, a major part of the good solvent is extracted out in the immersion step in a poor solvent solidification bath that is the formation step for the precursor, polyamic acid porous film, and therefore, the above-mentioned foaming phenomenon does not occur in the thermal imidation step. However, in case where the heat treatment is carried out at an extremely high temperature as compared with the temperature profile of such that the glass transition temperature of the polyamic acid rises in accordance with the procedure of the imidation reaction, then the polymer may flow to clog the pores therefore causing a problem in that the film may be densified and the vapor permeability thereof may be thereby worsened.

Contrary to this, the present inventors have found that, in the thermal imidation treatment of a polyamic acid porous film, when the film is heated at a heating rate of at least 50° C./min, preferably at least 70° C./min, more preferably at least 100° C./min in a temperature range of 200° C. or higher, then the porous polyimide film obtained in the present invention can have greatly enhanced surface opening rate and pore size and can therefore have greatly enhanced substance permeability for vapor and others. The action mechanism of enhancing the substance permeability of the film at a heating rate of 50° C./min or more is not clarified as yet. Regarding this, however, it may be considered that in the polyamic acid porous film having macrovoids, substance movement to cause film densification would not occur owing to the high porosity of the film, and the organic compound (B) having a polar group that is used as the starting material would prevent the polyamic acid molecules from flowing.

In case where the porous polyimide film of the present invention is produced via a polyamic acid solution or a polyimide solution, the porosity, the film thickness, the mean pore size in the surface, the maximum pore size and the mean pore size in the central part of the film can be suitably planned by suitably selecting the type of the polymer to be used, the polymer concentration, the viscosity and the organic solvent in the polymer solution, and the solidification condition (including the type and the temperature of the solvent replacement rate controlling layer, and the solidification solvent), etc.

Depending on the intended use thereof, the porous polyimide film of the present invention may be surface-treated on at least one surface thereof through corona discharge treatment, plasma discharge treatment by low-temperature plasma discharge or normal pressure plasma discharge, or chemical etching. Also if desired, the surface layers (a) and/or (b) may be faced. These treatments control the substance permeability, the surface pore size and the wettability of the film.

The porous polyimide film of the present invention is excellent in substance permeability for vapor or the like, and is therefore favorably used for vapor filters, liquid filters, vapor-permeable members, etc.

In addition, since polyimide is excellent in heat resistance as compared with other plastics, the porous polyimide film of the present invention can be used in an operating temperature range of 250° C. or higher. As concrete examples, there are mentioned protective films for acoustic members such as microphones for mobile telephones, etc., and the film is not broken even in thermal history during welding treatment. The film can also be used as heat-resistant filters. Heat-resistant filters formed of nonwoven aramid fabric heretofore used in the art are thermally degraded during use, and the binder contained therein is carbonized to be a source of dust; however, the heat-resistant filters formed of the porous polyimide film of the present invention are free from such problems. In addition, the film can be used as dustproof heat-resistant filters for hot air circulation lines in vehicle body coating booths.

EXAMPLES

The present invention is described in more detail with reference to the following Examples, but the present invention is not limited to these Examples.
(Evaluation of Porous Polyimide Film)
1) Film Thickness
The film thickness was measured with a contact-type thickness indicator.
2) Vapor Permeability The Gurley value (the number of seconds necessary for 100 cc of air to penetrate through the film under a pressure of 0.879 g/m$^2$) of the film was measured according to JIS P8117.
3) Dimensional Stability
The film was analyzed for the dimensional stability thereof under the condition at 200° C. and for 2 hours, according to ASTM D1204.
4) Mean Pore Size in Surface
On the scanning electron micrograph of the porous film surface, at least 200 pores were analyzed for the pore area thereof. From the mean value of the pore area data and according to the following formula (1), the mean diameter of the pores each considered as a true circle was calculated.
[Numerical Formula 1]

$$\text{Mean Pore Size} = 2 \times (Sa/\pi)^{1/2} \quad (1)$$

(In the formula, Sa means the mean value of the pore area.)
5) Maximum Pore Size in Surface
On the scanning electron micrograph of the porous film surface, at least 200 pores were analyzed for the pore area thereof. From the pore area, the diameter of each pore considered as a true circle was calculated, and the maximum value was taken as the maximum pore size.
6) Porosity
The film thickness and the mass of the porous film cut in a predetermined size were measured, and from the unit weight of the film, the porosity thereof was calculated according to the following formula (2). [Numerical Formula 2]

$$\text{Porosity} = S \times d \times D/w \times 100 \quad (2)$$

(In the formula, S means the area of the porous film, d means the film thickness, w means the found mass, and D means the density of polyimide. The polyimide density is 1.34 g/cm$^{3.}$)
7) Glass Transition Temperature (° C.)
Using a solid viscoelasticity analyzer, the dynamic viscoelasticity of the film was measured in a tension mode under the condition of a frequency of 10 Hz and a strain of 2% in a nitrogen gas atmosphere, and in the temperature distribution profile thereof, the temperature at which the loss tangent shows the maximum value was taken as the glass transition temperature.
8) Solution Viscosity
The solution viscosity was measured with an E-type rotary viscometer. The process for measurement is shown below.

(i) The polyamic acid solution prepared in Production Example was put into a closed chamber, and kept in a thermostat bath at 30° C. for 10 hours.
(ii) Using an E-type viscometer (by Tokyo Keiki, high-viscosity (EHD-type) cone-and-plate rotary viscometer, Cone Rotor: 1°34'), the polyamic acid solution prepared in (i) was analyzed at a temperature of 30±0.1° C. One sample was analyzed three times under the same condition, and the resulting data were averaged. In case where the found data fluctuated by 5% or more, the sample was analyzed twice more, and all the found data in five times were averaged to give the mean value.
9) Compression Stress Load Test at 250° C. for 15 minutes under 0.5 MPa
The film to be analyzed was cut into a 3-cm square, and 9 marks were lattice-wise given to the surface thereof using permanent marker, and the film thickness was measured with a contact-type thickness indicator. Next, using a high-precision hot press of a compression platen having a degree of parallelness of less than ±10 μm and a temperature fluctuation of ±1° C., the film to be analyzed was compressed at 250° C. for 15 minutes under 0.5 MPa. Subsequently, the film was put on a SUS plate at room temperature for 30 minutes, and using the contact-type thickness indicator, the film thickness at the marked part was measured. The film thickness change before and after compression at 9 marked points was determined according to the following formula (3). The mean value of the 9 points is the film thickness change.
[Numerical Formula 3]

$$\text{Film Thickness Change (\%)} = (1 - ((\text{film thickness after compression})/(\text{film thickness before compression}))) \times 100 \quad (3)$$

Production Example 1

Preparation of Polyamic Acid Solution Composition A

Using N-methyl-2-pyrrolidone (NMP) as a solvent, 3,3',4,4'-biphenyltetracarboxylic acid dianhydride (s-BPDA) as an acid anhydride and 4,4'-diaminodiphenyl ether as a diamine were put into a 500-ml separable flask, as so metered that their molar ratio could be nearly 1 and the polymer concentration could be 6% by mass. Subsequently, this was covered with a separable cover equipped with a stirring blade, a nitrogen introduction duct and an exhaust duct, and stirring the contents therein was started. After 23 hours, benzoic acid in an amount of 30 parts by mass relative to 100 parts by mass of the polyamic acid, and 3,3',4,4'-biphenyltetracarboxylic acid in an amount of 1 part by mass relative to 100 parts by mass of the polyamic acid were added to the flask, and stirring them was further continued. After 30 hours, the stirring was stopped, and the dope in the flask was filtered through a pressure filter (filter paper: Advantec Toyo's Filter Paper No. 60 for viscous liquid) to give a polyamic acid solution composition A. The solution composition A was a viscous suspension liquid, and the viscosity thereof was 450 poises (45 Pa·s) (25° C.).

Production Example 2

Preparation of Polyamic Acid Solution Composition B

A polyamic acid solution composition B was prepared in the same manner as in Production Example 1 except that benzoic acid was changed to granular polyacrylonitrile (Mitsui Chemical's trade name: Valex 2090MN). The solution composition B was a viscous suspension liquid, and the viscosity thereof was 420 poises (42 Pa·s) (25° C.).

Production Example 3

Preparation of Polyamic Acid Solution Composition C

A polyamic acid solution composition C was prepared in the same manner as in Production Example 1 except that benzoic acid was not added. The solution composition C was a viscous suspension liquid.

Example 1

At room temperature using a desk-top automatic coater, the polyamic acid solution composition A prepared in Production Example 1 was uniformly cast and applied onto a 20-cm square stainless substrate of which the surface had been mirror-polished, in a coating thickness of about 150 μm. Subsequently, this was left in air at a temperature of 23° C. and a humidity of 40% for 90 seconds, and thereafter the entire substrate was put into a solidification bath (water 80 parts by mass/NMP 20 parts by mass, room temperature). After thus put thereinto, the substrate was left therein for 8 minutes to thereby make the polyamic acid film deposited on the substrate. Subsequently, the substrate was taken out of the bath, and the polyamic acid film deposited on the substrate was peeled off, and then immersed in pure water for 3 minutes to produce a polyamic acid film. The polyamic acid film was dried in air at a temperature of 23° C. and a humidity of 40%, then fitted to a 10-cm square pin tenter and set in an electric furnace. This was heated up to 150° C. at a heating rate of about 10° C./min, then further heated up to 380° C. at a heating rate of 100° C./min, and kept as such for 3 minutes. The heat treatment according to the temperature profile gave a porous polyimide film. The properties of the obtained film are shown in Table 1.

The cross section of the porous polyimide film was investigated with a scanning electron microscope, which confirmed therein a large number of macrovoids having a length in the film lateral direction of at least 10 μm, and confirmed the following:

Of the voids having a length in the lateral direction of at least 5 μm, the number of voids, of which the ratio of the length in the lateral direction (L) to the length in the film thickness direction (d), L/d fell within a range of from 0.5 to 3, was at least 70%.

The film had a large number of macrovoids having a length in the film lateral direction of at least 10 μm, and the cross-sectional area of those macrovoids was at least 70% of the overall cross-sectional area of the film.

The glass transition temperature of the porous polyimide film was about 280° C., and the dimensional stability at 200° C. was within 1%. The film thickness change after compression stress load at 250° C. for 15 minutes under 0.5 MPa was at most 1%.

The surface of the porous polyimide film was investigated with a scanning electron microscope, which confirmed that the surface had a porous structure with a large number of through-pores running toward the surface on the substrate side of the film.

Example 2

A porous polyimide film was produced in the same manner as in Example 1 except that the heating rate from 150° C. to 380° C. was changed to 150° C./min. The properties of the obtained film are shown in Table 1.

The cross section of the porous polyimide film was investigated with a scanning electron microscope, which confirmed therein a large number of macrovoids having a length in the film lateral direction of at least 10 μm, and confirmed the following:

Of the voids having a length in the lateral direction of at least 5 μm, the number of voids, of which the ratio of the length in the lateral direction (L) to the length in the film thickness direction (d), L/d fell within a range of from 0.5 to 3, was at least 70%.

The film had a large number of macrovoids having a length in the film lateral direction of at least 10 μm, and the cross-sectional area of those macrovoids was at least 70% of the overall cross-sectional area of the film.

The glass transition temperature of the porous polyimide film of Example 2 was about 280° C., and the dimensional stability at 200° C. was within 1%. The film thickness change after compression stress load at 250° C. for 15 minutes under 0.5 MPa was at most 1%.

The surface of the porous polyimide film of Example 2 was investigated with a scanning electron microscope, which confirmed that the surface had a porous structure with a large number of through-pores running toward the surface on the substrate side of the film.

Example 3

A porous polyimide film was produced in the same manner as in Example 1 except that the polyamic acid solution composition A was changed to the polyamic acid solution composition B, and that the substrate was heated up to 150° C. at a heating rate of about 10° C./min and then up to 380° C. at a heating rate of 50° C./min. The properties of the obtained film are shown in Table 1.

The cross section of the porous polyimide film of Example 3 was investigated with a scanning electron microscope, which confirmed therein a large number of macrovoids having a length in the film lateral direction of at least 10 and confirmed the following:

Of the voids having a length in the lateral direction of at least 5 μm, the number of voids, of which the ratio of the length in the lateral direction (L) to the length in the film thickness direction (d), L/d falls within a range of from 0.5 to 3, was at least 70%.

The film had a large number of macrovoids having a length in the film lateral direction of at least 10 μm, and the cross-sectional area of those macrovoids was at least 70% of the overall cross-sectional area of the film.

The glass transition temperature of the porous polyimide film of Example 3 was about 280° C., and the dimensional stability at 200° C. was within 1%. The film thickness change after compression stress load at 250° C. for 15 minutes under 0.5 MPa was at most 1%.

The surface of the porous polyimide film of Example 3 was investigated with a scanning electron microscope, which confirmed that the surface had a porous structure with a large number of through-pores running toward the surface on the substrate side of the film.

Example 4

A porous polyimide film was produced in the same manner as in Example 3 except that the substrate was heated up to 150° C. at a heating rate of about 10° C./min and then up to 380° C. at a heating rate of 100° C./min. The properties of the obtained film are shown in Table 1.

Example 5

A porous polyimide film was produced in the same manner as in Example 3 except that the substrate was heated up to 150° C. at a heating rate of about 10° C./min and then up to 380° C. at a heating rate of 150° C./min. The properties of the obtained film are shown in Table 1.

Example 6

A porous polyimide film was produced in the same manner as in Example 3 except that the substrate was heated up to 150° C. at a heating rate of about 10° C./min and then up to 380° C. at a heating rate of 200° C./min. The properties of the obtained film are shown in Table 1.

The cross section of each porous polyimide film of Examples 4, 5 and 6 was investigated with a scanning electron microscope, which confirmed therein a large number of macrovoids having a length in the film lateral direction of at least 10 μm, and confirmed the following:

Of the voids having a length in the lateral direction of at least 5 μm, the number of voids, of which the ratio of the length in the lateral direction (L) to the length in the film thickness direction (d), L/d falls within a range of from 0.5 to 3, was at least 70%.

The films each had a large number of macrovoids having a length in the film lateral direction of at least 10 μm, and the cross-sectional area of those macrovoids was at least 70% of the overall cross-sectional area of the film.

The glass transition temperature of each porous polyimide film of Examples 4, 5 and 6 was about 280° C., and the dimensional stability at 200° C. was within 1%. The film thickness change after compression stress load at 250° C. for 15 minutes under 0.5 MPa was at most 1%. The surface of each porous polyimide film of Examples 4, 5 and 6 was investigated with a scanning electron microscope, which confirmed that the surface had a porous structure with a large number of through-pores running toward the surface on the substrate side of the film.

Example 7

A porous polyimide film was produced in the same manner as in Example 1 except that the heating rate from 150° C. to 380° C. was changed to 25° C./min. The properties of the obtained film are shown in Table 1.

Example 8

A porous polyimide film was produced in the same manner as in Example 3 except that the heating rate from 150° C. to 380° C. was changed to 25° C./min. The properties of the obtained film are shown in Table 1.

The surface of each porous polyimide film of Examples 7 and 8 was investigated with a scanning electron microscope, which confirmed that the surface had a porous structure with a large number of through-pores running toward the surface on the substrate side of the film.

Comparative Example 1

A porous polyimide film was produced in the same manner as in Example 1 except that the polyamic acid solution composition A was changed to the polyamic acid solution composition C. The properties of the obtained film are shown in Table 1.

The cross section of the porous polyimide film of Comparative Example 1 was investigated with a scanning electron microscope, which confirmed that a three-layered structure of two surface layers and a macrovoid layer sandwiched between them did not exist and few macrovoids existed therein.

The porous polyimide films obtained in Examples 1 to 8 were checked for the surface and the cross section thereof, using a scanning electron microscope. The scanning electron micrographs of those porous polyimide films are shown in FIGS. 5 to 22.

FIGS. 5, 7, 9, 11, 14, 17, 19 and 21 are the scanning electron micrographs (×100) of the porous polyimide films of Examples 1 to 8, respectively, on the air-surface of each porous polyimide film opposite to the stainless substrate-side surface thereof.

FIGS. 6, 8, 10, 12, 15, 18, 20 and 22 are the scanning electron micrographs (×100) of the porous polyimide films of Examples 1 to 8, respectively, on the stainless substrate-surface of each porous polyimide film.

Figure 13:
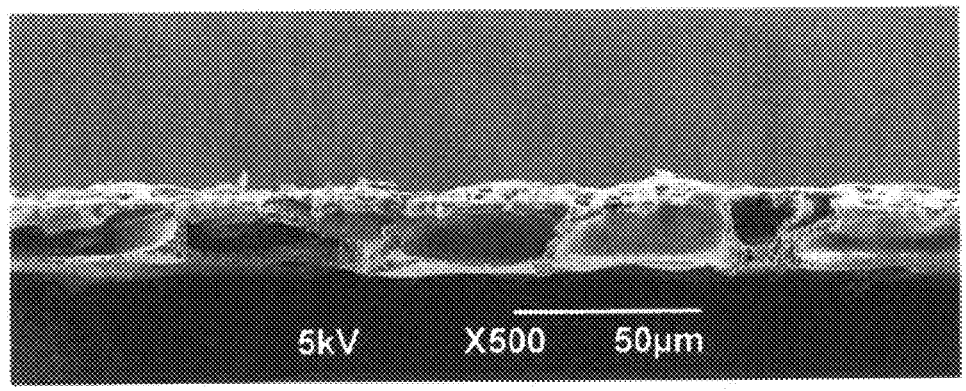
FIG. 13 is a scanning electron micrograph of the lateral section of the porous polyimide film of Example 4.
Figure 14:
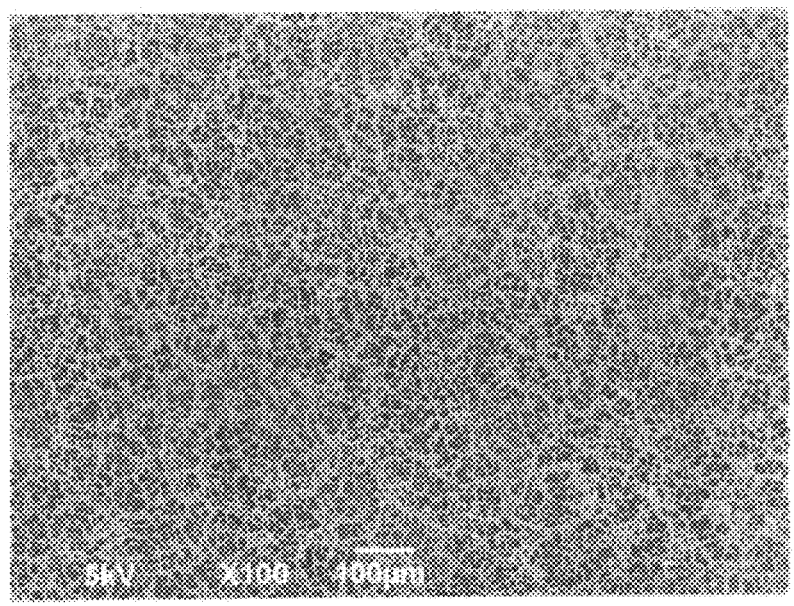
FIG. 14 is a scanning electron micrograph of the air-side surface of the porous polyimide film of Example 5.
Figure 15:
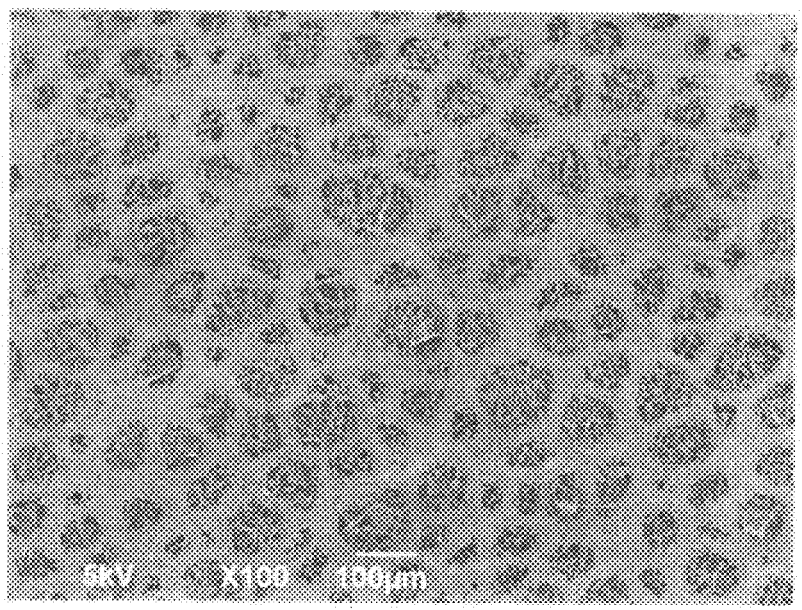
FIG. 15 is a scanning electron micrograph of the substrate-side surface of the porous polyimide film of Example 5.
Figure 16:
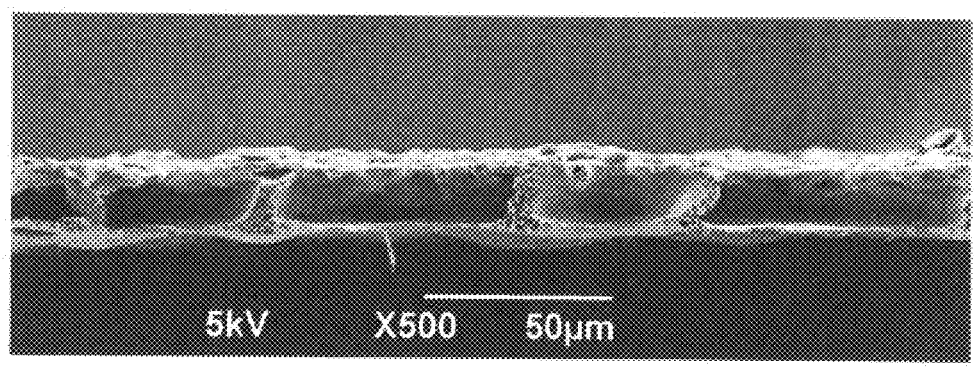
FIG. 16 is a scanning electron micrograph of the lateral section of the porous polyimide film of Example 5.
Figure 17:
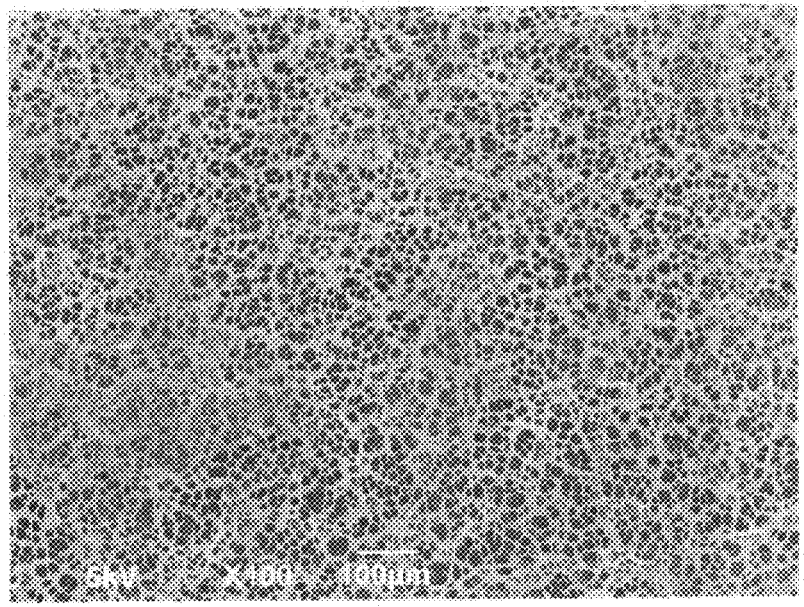
FIG. 17 is a scanning electron micrograph of the air-side surface of the porous polyimide film of Example 6.
Figure 18:
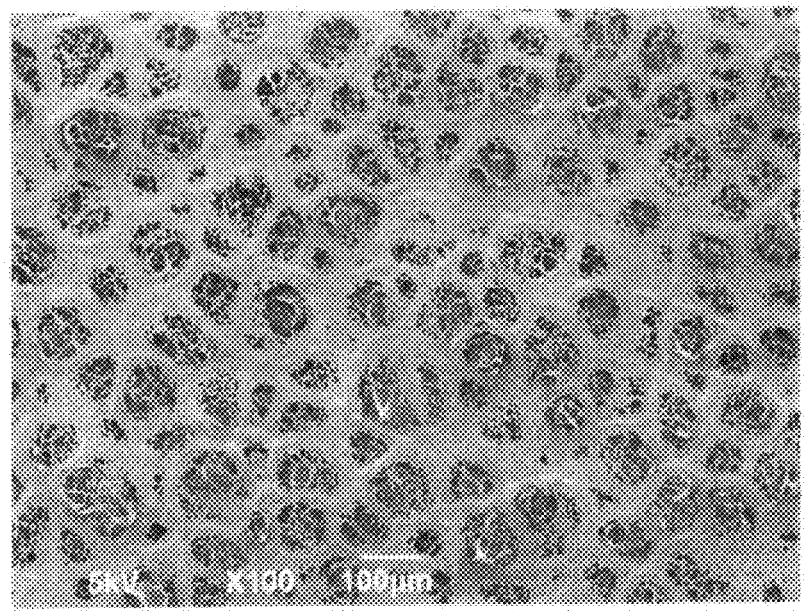
FIG. 18 is a scanning electron micrograph of the substrate-side surface of the porous polyimide film of Example 6.
Figure 19:
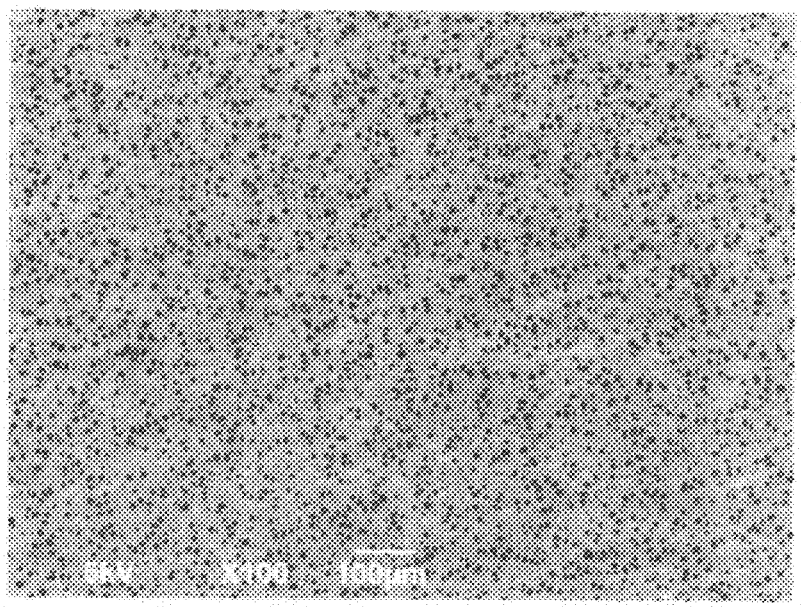
FIG. 19 is a scanning electron micrograph of the air-side surface of the porous polyimide film of Example 7.
Figure 20:
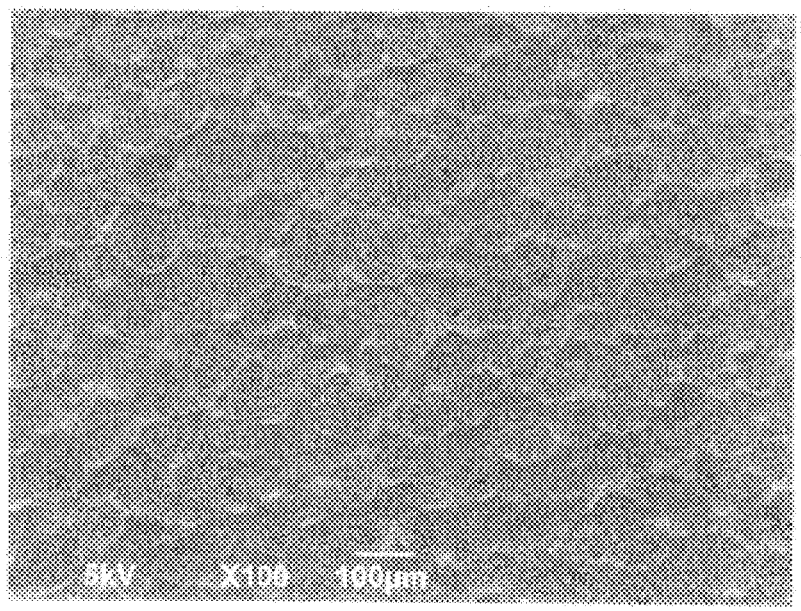
FIG. 20 is a scanning electron micrograph of the substrate-side surface of the porous polyimide film of Example 7.
Figure 21:
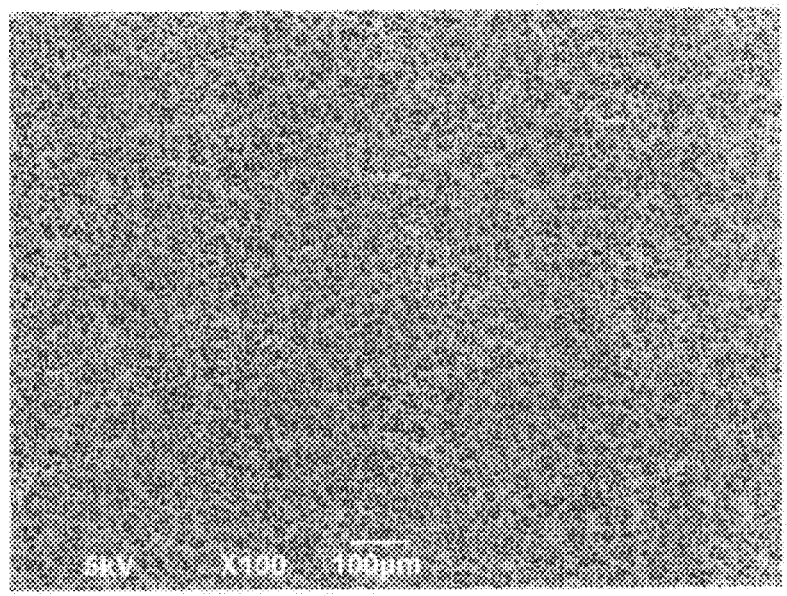
FIG. 21 is a scanning electron micrograph of the air-side surface of the porous polyimide film of Example 8.
Figure 22:
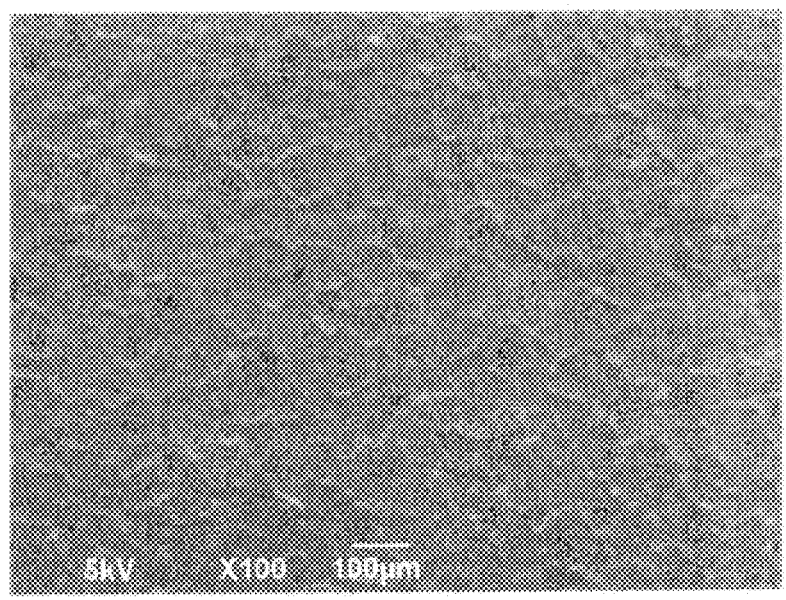
FIG. 22 is a scanning electron micrograph of the substrate-side surface of the porous polyimide film of Example 8.

FIGS. 13 and 16 are the scanning electron micrographs (×500) of the lateral cross section of the porous polyimide films of Examples 4 and 5, respectively.

As obvious from FIGS. 5, 7, 9, 11, 14, 17, 19 and 21, a large number of pores each having a diameter of at most 0.3 μm were detected on the air-side surface of each film. As obvious from FIGS. 6, 8, 10, 12, 15, 18, 20 and 22, a large number of pores falling within a range of from about 0.1 μm to about 5 μm were detected on the substrate-side surface of each film. In addition, as obvious from FIG. 13 and FIG. 16, there were formed a layer of the air-side surface and a layer of the substrate-side surface and further a partition wall supporting those surfaces and partitioning the macrovoids, and it was confirmed that the two surfaces and the partition wall (support) bonded almost ladder-wise to each other. In FIGS. 13 and 16, the upper side is a layer of the air-side surface and the lower side is a layer of the substrate-side surface. The width of the space (macrovoid) sandwiched between the two surfaces and the support was nearly at least 10 μm, and it was confirmed that the length in the lateral direction thereof was nearly at least 10 μm. Further, as obvious from FIGS. 13 and 16, all the cross section of the layer of the air-side surface, the cross section of the layer of the substrate-side surface and the cross section of the support had a porous structure and had a large number of pores formed in all these cross sections.

TABLE 1

| | Amic Acid Solution Composition | Additive | Heating Rate in Heat Treatment (° C./min) | Film Thickness (μm) | Porosity (%) | Gurley Value (sec) | Surface Mean Pore Size (μm) | Surface Opening Rate (%) | Back (substrate-side surface) Mean Pore Size (μm) | Back (substrate-side surface) Opening Rate (%) |
|---|---|---|---|---|---|---|---|---|---|---|
| Example 1 | A | benzoic acid | 50 | 27 | 74 | 0.4 | 36.2 | 29.0 | 132.0 | 19.0 |
| Example 2 | | acid | 100 | 26 | 73 | 0.1 | 55.6 | 35.2 | 196.0 | 28.4 |
| Example 3 | B | PAN | 50 | 27 | 71 | 1.3 | 12.7 | 19.0 | 20.3 | 8.9 |
| Example 4 | | | 100 | 26 | 72 | 0.2 | 24.6 | 20.7 | 26.8 | 20.5 |
| Example 5 | | | 150 | 26 | 71 | 0.1 | 59.1 | 34.0 | 45.1 | 28.0 |
| Example 6 | | | 200 | 25 | 69 | 0.1 | 94.1 | 36.0 | 63.3 | 33.0 |
| Comparative Example 1 | C | none | 50 | 20 | 58 | 36.0 | 2.5 | 0.5 | 0.7 | 8.0 |
| Example 7 | A | benzoic acid | 25 | 28 | 78 | 18.0 | 17.2 | 23.0 | 5.8 | 2.0 |
| Example 8 | B | PAN | 25 | 28 | 76 | 13.0 | 12.5 | 22.6 | 8.1 | 0.6 |

PAN: Polyacrylonitrile

As in Table 1, in Comparative Example 1 in which the porous film of a polyamic acid was formed using the amic acid solution composition C not containing benzoic acid or polyacrylonitrile, a porous polyimide film having a three-layered structure of two surface layers and a macrovoid layer sandwiched between the surface layers and excellent in substance permeability, as in the present invention, could not be produced.

As opposed to this, the porous polyimide films of Examples 1 to 6 have an extremely low Gurley value of from 0.1 to 1.7 and are excellent in substance permeability.

Regarding Examples 1, 2 and 7, the Gurley value is lower and the opening rate is larger in the order of the film of Example 2, the film of Example 1 and the film of Example 7. This may be caused by the heating rate in heat treatment.

Regarding Examples 3 to 6 and 8, the Gurley value is lower, the opening rate is larger and the mean pore size is larger in the order of the film of Example 6, the film of Example 5, the film of Example 4, the film of Example 3 and the film of Example 8. This may be caused by the heating rate in heat treatment.

Comparative Examples 2 and 3

Commercially-available polytetrafluoroethylene (PTFE) nonwoven fabric and membrane filter (Millipore's trade name: OMNIPORE, filter type: 10 μm JC) were tested for the film thickness change after compression stress load at 250° C. for 15 minutes under 0.5 MPa. The film thickness change of the two was 52% and 78%, respectively.

Industrial Applicability

The porous polyimide film of the present invention is excellent for substance permeability for vapor, etc., and is favorably used for vapor filters, liquid filters, vapor-permeable members, etc. In addition, the porous polyimide film of the present invention is excellent in heat resistance and can be used even in an operating temperature range of 250° C. or higher, and is therefore favorably used for protective films for acoustic members, heat-resistant filters, etc.

DESCRIPTION OF REFERENCE NUMERALS AND SIGNS

1 Porous Polyimide Film
2 Surface Layer (a)
25 Pore
3 Macrovoid Layer
31 Macrovoid
32 Partition Wall (support)
35 Pore
4 Surface Layer (b)
45 Pore

The invention claimed is:
1. A porous polyimide film, comprising
a first surface layer,
a second surface layer, and
a macrovoid layer between the first and second surfaces layers,
wherein the macrovoid layer comprises a partition wall bonding to each of the first and second surface layers,
the macrovoid layer further comprises multiple macrovoids each surrounded by the partition wall and the first and second surface layers,
a mean pore size of the macrovoids in a film plane direction is from 10 to 500 μm,
the partition wall of the macrovoid layer has a thickness of from 0.1 to 50 μm,
the partition wall of the macrovoid layer comprises multiple pores having a mean pore size of from 0.01 to 50 μm,
the first and second surface layers each have a thickness of from 0.1 to 50 μm,
the first surface layer comprises multiple pores having a mean pore size of from 12.7 μm to 94.1 μm,
the second surface layer comprises multiple pores having a mean pore size of from 20.3 μm to 196.0 μm,
the multiple pores in the partition wall of the macrovoid layer, the multiple pores in the first surface layer, and the multiple pores in the second surface layer communicate with each other and further communicate with the multiple macrovoids, and
the porous polyimide film has a total thickness of from 5 to 500 μm and a porosity of from 60 to 95%; and
wherein said porous polyimide film has a Gurley value of at most 1.3 seconds,
wherein the porous polyimide film is obtained from a polyamic acid solution composition comprises a polyamic acid solution and at least one of a benzoic acid and a polyacrylonitrile,
the polyamic acid solution comprises from 0.3 to 60% by mass of a polyamic acid and from 40 to 99.7% by mass of an organic polar solvent,
the polyamic acid comprises at least one tetracarboxylic acid dianhydride and at least one diamine, a total content of the benzoic acid and the polyacrylonitrile is from 0.1 to 200 parts by mass relative to 100 parts by mass of the polyamic acid.

2. The porous polyimide film of claim 1, wherein the mean pore size in the film plane direction of the multiple macrovoids is from 10 to 500 μm, as seen from a side of the first surface layer, a side of the second surface layer, or both.

3. The porous polyimide film of claim 1, wherein the thickness of the partition wall of the macrovoid layer and the thickness of the first and second surface layers are nearly equal.

4. The porous polyimide film of claim 1, wherein a change in the total thickness of porous polyimide film after given a compression stress load of 0.5 MPa at 250° C. for 15 minutes is at most 5%.

5. The porous polyimide of claim 1, wherein, in a film cross section of the porous polyimide film as cut vertically to a film plane direction, a cross section of the multiple macrovoids is at least 50% of the film cross section.

6. The porous polyimide film of claim 1, wherein, in a film cross section of the porous polyimide film as cut vertically to a film plane direction, at least 60% of the macrovoids have a ratio of a length in the film plane direction to a length in a film thickness direction of from 0.5 to 3.

7. The porous polyimide film of claim 1, wherein the porous polyimide film has a glass transition temperature of 240° C. or higher, or wherein the porous polyimide film does not have a definite transition point at 300° C. or higher.

8. The porous polyimide film of claim 1, wherein the first and second surface layers each have a thickness of from 0.5 to 10 μm.

9. The porous polyimide film of claim 1, wherein the macrovoid layer has a honeycomb structure.

10. The porous polyimide film of claim 1, wherein the thickness of the partition wall of the macrovoid layer is from 1 to 15 μm.

11. A process for producing the porous polyimide film of claim 1, the process comprising:
   filmwise casting the polyamic acid solution composition, thereby obtaining a film, immersing the film in or contacting the film with a solidifying solvent, the solidifying solvent comprising water as an indispensable ingredient, thereby obtaining a porous film, and imidating the porous film, through heat treatment,
   the imidating comprises heating at 200° C. or higher at at least 25° C./min.

12. The process of claim 11, wherein the at least one tetracarboxylic acid dianhydride is selected from the group consisting of biphenyltetracarboxylic acid dianhydride and pyromellitic acid dianhydride, and wherein the at least one diamine is selected from the group consisting of benzenediamine, diaminodiphenyl ether, and bis(aminophenoxy)phenyl.

13. The process of claim 11, wherein the solidifying solvent is water or a mixed liquid of from 5% by mass to less than 100% by mass of water and from more than 0% by mass to 95% by mass of an organic polar solvent.

* * * * *